US008234008B2

(12) United States Patent
Weber

(10) Patent No.: US 8,234,008 B2
(45) Date of Patent: Jul. 31, 2012

(54) LIDDED DRAWER FOR SINGLE LINE ITEM DISPENSING

(75) Inventor: Frank Dean Weber, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 341 days.

(21) Appl. No.: 12/396,404

(22) Filed: Mar. 2, 2009

(65) Prior Publication Data

US 2009/0224638 A1 Sep. 10, 2009

Related U.S. Application Data

(60) Provisional application No. 61/032,819, filed on Feb. 29, 2008.

(51) Int. Cl.
*G06F 17/00* (2006.01)

(52) U.S. Cl. ........ 700/242; 700/231; 700/236; 700/237; 312/215; 221/130; 221/131

(58) Field of Classification Search .................. 700/231, 700/242, 236, 237; 312/215, 222; 221/131, 221/130
See application file for complete search history.

(56) References Cited

U.S. PATENT DOCUMENTS 5,927,540 A * 7/1999 Godlewski ........................ 221/2
6,011,999 A 1/2000 Holmes
6,065,819 A * 5/2000 Holmes et al. ................ 312/215
6,109,774 A * 8/2000 Holmes et al. ................ 700/231
6,640,159 B2 * 10/2003 Holmes et al. ................ 700/244
6,996,455 B2 * 2/2006 Eggenberger et al. ........ 700/231
7,052,097 B2 * 5/2006 Meek et al. ................... 312/222

OTHER PUBLICATIONS

"Omnicell : Solutions : For Medication-Use Preocess : Medication Dispensing systems : Pharmacy Modules : Locking Drawer", pp. 1-2, 1999-2009 Omnicell, Inc.
"Omnicell : Solutions : For Medication-Use Preocess : Medication Dispensing systems : Pharmacy Modules : Sensing Drawer", pp. 1-2, 1999-2009 Omnicell, Inc.
"Omnicell : Solutions : For Medication-Use Preocess : Medication Dispensing systems : Pharmacy Modules : FlexBin™ Single-Dose Drawer", pp. 1-2, 1999-2009 Omnicell, Inc.
"Pyris MedStation® 3500 System Specifications Booklet", Nov. 2006, Cardinal Health, San Diego.

* cited by examiner

*Primary Examiner* — Timothy Waggoner
(74) *Attorney, Agent, or Firm* — McDermott Will & Emery LLP

(57) ABSTRACT

A medication cabinet that includes at least one drawer, a drive mechanism, and a drawer latching mechanism, is disclosed. The drawer includes a slider, and a container that includes a receptacle and a lid that moves between an open position and a closed position. The container also includes a fastener to fasten the lid to the receptacle. The slider maintains the lid in the closed position when at least a portion of the wall is coupled with the fastener, and actuates the lid from the closed position to the open position when the fastener passes through an opening in the wall. The drive mechanism controls longitudinal movement of the slider, and is mounted to the chassis, allowing the drawer to be free of electrical connections with the chassis. When the drive mechanism is not used to move the lid into the open position, longitudinal movement of the slider is inhibited.

12 Claims, 20 Drawing Sheets

LIDDED DRAWER FOR SINGLE LINE ITEM DISPENSING

CROSS-REFERENCE TO RELATED APPLICATIONS

This application claims priority to U.S. Provisional Patent App. No. 61/032,819, filed on Feb. 29, 2008, the entire contents of which are herein incorporated by reference.

BACKGROUND

1. Field

The present disclosure generally relates to apparatus and methods for storing items, such as medications, and particularly to controlled access to drawer containers that store medications.

2. Description of the Related Art

It is well known in the medical community, and in particular, in hospitals, to store medications in a centralized area or station for dispensing and administering the medications to patients. These stations have often been unsecured, allowing access to unauthorized persons. Consequently, there are several risks associated with these unsecured stations, such as the wrong type or amount of medication being administered to a patient (e.g., such as when medication is taken from an incorrect container in the station), the medication being stolen, or the mixing of medications.

Securable medication dispensing cabinets that seek to address these risks often contain complex mechanics in order to lock medication containers, which both reduces the amount of space in the cabinet to store medications, and increases the manufacturing cost of the cabinet. Additionally, and also often due to the complexity of the mechanics, the containers are not adjustable or reconfigurable in size, such that larger medications may not fit in a container, or smaller medications may waste excess space in the container. In many cases, unauthorized access to both secured and unsecured medication dispensing cabinets often goes undetected. For example, it is difficult for an authorized user during routine use to determine if a cabinet has been tampered with or insubstantially damaged in order to inappropriately access medications.

SUMMARY

Embodiments of the medication cabinet disclosed herein provide drawers with lockable containers that give secure access to individual items, while also providing a user with the flexibility to configure the size of the container for a large range of item sizes. The low profile locking mechanism disclosed herein allows for the efficient storage and dispensing of a large number of items within a given volume. The tamper-evident restricted use disclosed herein provides a clear indication to authorized users that the medication cabinet has been tampered with or damaged. This is achieved without a need for electrical sensing within the drawer. Additionally, all of the drawers in the medication cabinet may be driven by a single motor in the medication cabinet, thereby reducing the complexity of the mechanics of each drawer, resulting in a lower cost of manufacturing, and without a need for an electrical or electronic connection between the drawer and the cabinet.

According to one embodiment of the present disclosure, a medication cabinet is provided. The medication cabinet includes a drawer, a drive mechanism, and a drawer latching mechanism. The drawer includes at least one container and a slider. The at least one container includes a receptacle and a lid, coupled to the receptacle, configured for movement between an open position and a closed position configured to restrict access to the receptacle. The at least one container also includes a fastener, coupled to the lid, configured to fasten the lid to the receptacle when the lid is in the closed position, and a plurality of ribs extending away from a surface of the receptacle. The slider is coupled to the drawer and is configured to move longitudinally along a direction of movement of the drawer. The slider includes a plurality of projections, and a wall. The wall includes at least one opening, and is configured to maintain the lid in the closed position when at least a portion of the wall is coupled with the fastener, and is configured to actuate the lid from the closed position to the open position when the fastener passes through the at least one opening. The drive mechanism is coupled to the cabinet and configured to control longitudinal movement of the slider. The drawer latching mechanism is coupled to the cabinet and is configured to couple the drawer to the cabinet. When the drive mechanism is not used to move the lid into the open position, the fastener is configured to decouple from the lid when the lid is forced open, and engage at least one projection of the slider, thereby inhibiting longitudinal movement of the slider.

According to another embodiment of the present disclosure, a medication cabinet is provided. The medication cabinet includes a drawer and a drive mechanism. The drawer includes at least two containers and a slider. Each container includes a receptacle and a lid, coupled to the receptacle. The lid is configured for movement between an open position and a closed position configured to restrict access to the receptacle. The lid includes a fastener, coupled to the lid, that is configured to fasten the lid to the receptacle when the lid is in the closed position. The slider is coupled to the drawer and is configured to move longitudinally along a direction of movement of the drawer. The slider includes a wall that includes at least one opening. The slider is configured to maintain the lid of each container in the closed position when at least a portion of the wall is coupled with the fastener of each container, and the slider is configured to actuate the lid of one of the two containers from the closed position to the open position when the fastener of one container passes through the opening while the portion of the wall remains coupled to the fastener of the lid of the other container. The drive mechanism is coupled to the cabinet and is configured to control longitudinal movement of the slider.

According to a further embodiment of the present disclosure, a medication cabinet is provided. The medication cabinet includes a drawer, a drive mechanism, and a drawer latching mechanism. The drawer includes at least one container and a slider. The at least one container includes a receptacle and a lid, coupled to the receptacle, configured for movement between an open position and a closed position configured to restrict access to the receptacle. The at least one container also includes a fastener, coupled to the lid, configured to fasten the lid to the receptacle when the lid is in the closed position, and a plurality of ribs extending away from a surface of the receptacle. The slider is coupled to the drawer and is configured to move longitudinally along a direction of movement of the drawer. The slider includes a plurality of projections, and a wall. The wall includes at least one opening, and is configured to maintain the lid in the closed position when at least a portion of the wall is coupled with the fastener, and is configured to actuate the lid from the closed position to the open position when the fastener passes through the at least one opening. The drive mechanism is coupled to the cabinet and configured to control longitudinal movement of the slider.

The drawer latching mechanism is coupled to the cabinet and is configured to couple the drawer to the cabinet. When the drive mechanism is not used to move the lid into the open position, the fastener is configured to decouple from the lid and engage at least one projection of the slider, thereby inhibiting longitudinal movement of the slider.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the discussed embodiments as claimed.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be obvious, however, to one ordinarily skilled in the art that the embodiments of the present disclosure may be practiced without some of these specific details. In other instances, well-known structures and techniques have not been shown in detail not to obscure the disclosure.

Certain embodiments of the cabinet disclosed herein provide a system in which a user is limited to accessing one container of a drawer containing one item type at a time (e.g. "single line item dispensing"). This feature has special utility in a hospital or other patient care environment, where patient safety is improved by limiting opportunities for a healthcare professional to access an incorrect medication. Advantages similar to those provided in the hospital environment can be found in other applications where controlled access is provided to items due to their high value or potential inappropriate use. Multiple drawers can also be driven by a single motor. This may include up to all of the drawers in the medication cabinet, thereby reducing the complexity of the mechanics of each drawer, and the complexity of the system in providing access to a container in each drawer. The system is configured to indicate that an unauthorized entry to a drawer in the cabinet has occurred, such as by restricting further access to the drawer, or issuing a visible, audible, or electronic alert to an authorized user or administrator.

Figure 1:
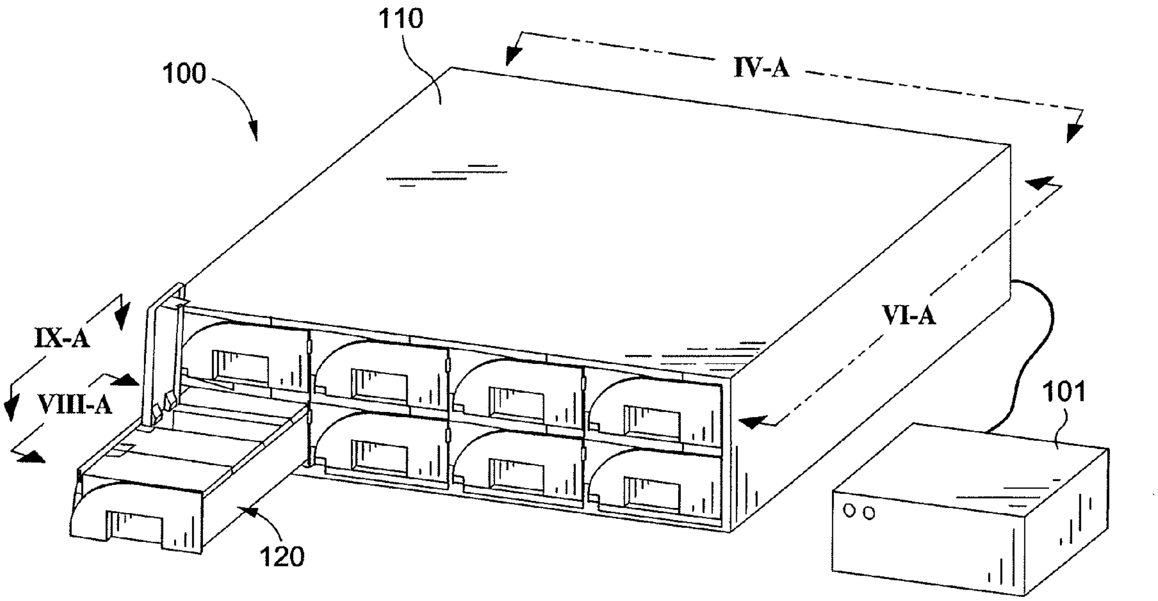
FIG. 1 illustrates a medication cabinet according to one embodiment.

Referring now to the drawings, FIG. 1 illustrates a medication cabinet 100 according to one embodiment. This configuration is exemplary only, such that other physical configurations may be employed without departing from the scope of this disclosure. The medication cabinet 100 includes a chassis frame 110 ("chassis 110") in which a plurality of drawers 120 are housed. In the illustrated exemplary embodiment, eight drawers are included in the medication cabinet 100 in a four-wide by two-high configuration. Other drawer configurations may be employed without departing from the scope of the disclosure. A first drawer 120 is illustrated in a partially withdrawn state from the medication cabinet 100. One of the lids in the drawer 120 is in an open state in FIG. 1. The opening of the lids will be described in more detail below. In certain embodiments, the medication cabinet 100 is connected to a computer system 101, which is described in more detail below.

Figure 2A:
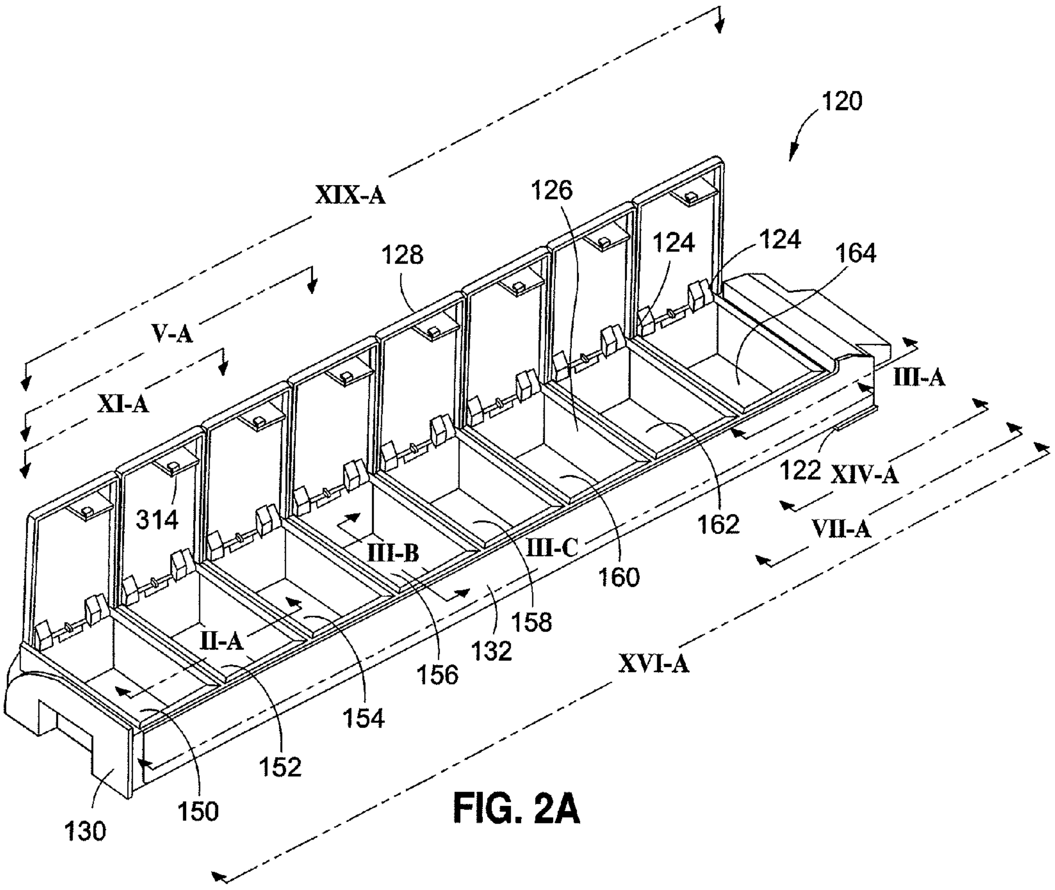
FIG. 2A is a view of an exemplary medication cabinet drawer in isolation, from the medication cabinet of FIG. 1.

FIG. 2A illustrates a drawer 120 included in the medication cabinet 100 of FIG. 1. Each of the drawers 120 can be configured as in the following embodiments. The drawer 120 includes a sleeve body 130 housing eight containers 150 to 164, a cover 132, and a stop 122.

Figure 2B:
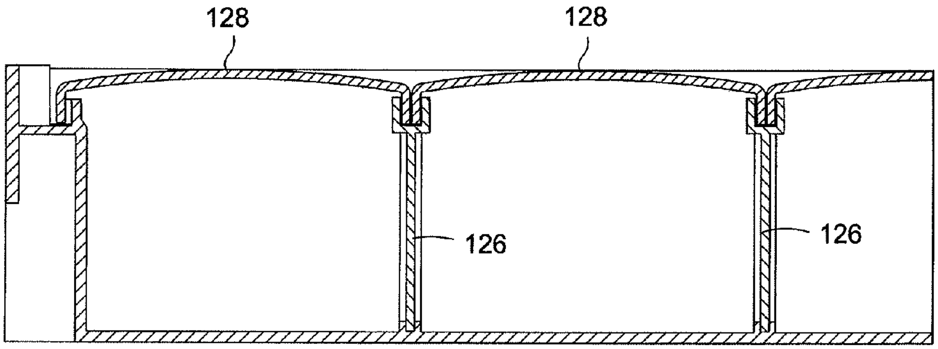
FIG. 2B illustrates a side cross-sectional view of a portion of the drawer of FIG. 2A in the direction of arrow II-A, but with the lids closed.

The containers 150 to 164 are configured to store items, such as medications and medical devices. Each individual container 150 to 164 includes a receptacle, which is defined by the four sides of the container, and a lid 128. The containers 150 to 164 are created by dividers 126, also illustrated in FIG. 2B, a side cross-sectional view of a portion of the drawer 120 of FIG. 2A in the direction of arrow II-A with lids closed, to define a common wall shared by two neighboring containers, such as containers 150 and 152. The lid 128 is coupled to the receptacle and is configured to move between an open position allowing access to the receptacle of the container, and a closed position restricting access to the receptacle of the container. Movement of the lid 128 between the closed position to the open position is facilitated by the use of springs 124 that are coupled to the lid 128 near where the lid 128 couples to the receptacle. The lid 128 includes a fastener 314, coupled to the lid 128, which is configured to maintain the lid 128 in a closed position, as discussed in further detail below. In certain embodiments, the springs 124 provide enough force to move the lid 128 from the closed position to the open position if the fastener 134 of the lid is not coupled to or restricted by another object, as discussed below.

The sleeve body 130 extends from a proximal end of the drawer 120 (i.e., near container 150) to a distal end of the drawer 120 (i.e., near container 164). Hence, the stop 122 is located at the distal end of the drawer 120. The cover 132, which extends along the side of the drawer 120, covers mechanical features of the drawer 120, which will be discussed in further detail below. The cover 132 secures the mechanical functionality of the drawer 120 so as to prevent tampering, and may also improve appearance of the drawer 120.

In certain embodiments, in order to remotely track access to the drawer 120, each drawer 120 in the medication cabinet 100 may be labeled with a unique identifier, such as a serial number, which can be coded into a barcode label or other indicator placed on the bottom of the drawer 120. The label (not illustrated) may be scanned when the drawer is remotely reconfigured, or when items are loaded remotely (e.g., in a hospital pharmacy) into containers 150 to 164 in the drawer 120. The label may then be scanned again before the drawer 120 is inserted into the chassis 110 cavity of the medication cabinet 100 so that the contents and configuration of the drawer 120 can be identified, such as by a computer system 101 connected to the medication cabinet 100.

Figure 3A:
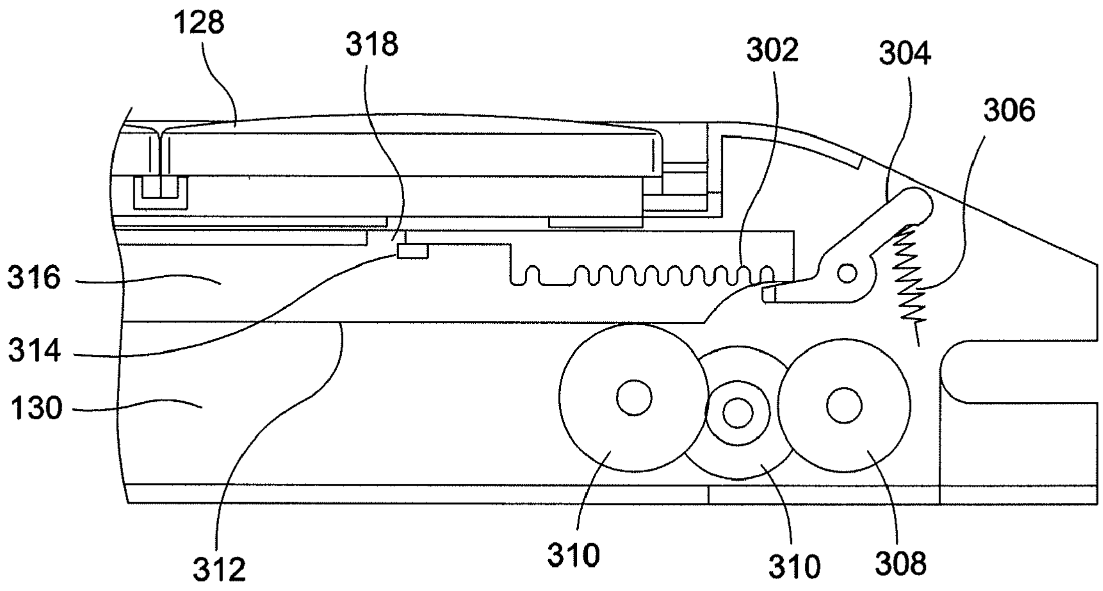
FIG. 3A illustrates a side cross-sectional view of another portion of the drawer of FIG. 2A with the cover removed, in the direction of arrow III-A.

FIG. 3A illustrates a side cross-sectional view of the distal portion of the drawer 120 of FIG. 2A in the direction of arrow III-A of FIG. 2A, with the cover 132 removed. The distal portion of the drawer 120 includes a latch slider 316 ("slider 316"), gear train 310, driven gear 308, and lock lever 304.

In FIG. 3A, the slider 316 is in a position that maintains all lids 128 in a closed position. The slider 316 is movably coupled to the drawer 120 when the drawer is closed, and configured to move longitudinally along a longest axis of the drawer (e.g., the direction in which the drawer is removed from the cabinet, left or right in FIG. 3A). The slider 316 includes a wall with an opening or aperture 318. If the lid 128 is not held in a closed position by another object, such as an inside wall of the chassis cavity 320 (discussed below with reference to FIG. 3C), the slider 316 is in contact with the fastener 314, as illustrated, and the slider 316 maintains the lids 128 in the closed position. Each lid 128 is loaded upward by a corresponding lid spring 124 so that the fastener 314 is loaded against the slider 316. If, however, the fastener 314 is able to pass through the aperture 318, the lid 128 is actuated from the closed position to the open position due in part to the load force provided by the lid spring 124.

Figure 3B:
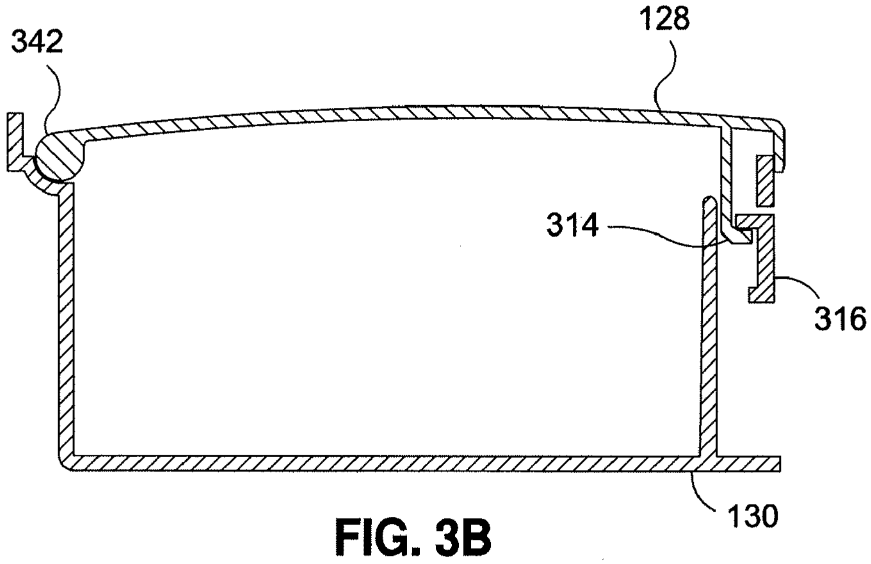
FIG. 3B illustrates a cross-section of a portion of the drawer of FIG. 3A, in the direction of arrow III-B, with the lids closed.

The slider 316 contains a plurality of detents 302 at its distal end. Gears 308 and 310 facilitate lateral movement of the slider 316. The lock lever 304 is coupled to the detents 302 and is loaded by a spring 306 to positively engage one of the slider detents 302. FIG. 3B illustrates a cross-section of a portion of the drawer of FIG. 3A, in the direction of arrow III-B of FIG. 3A, with the lids closed, and where a surface of slider 316 is in shown in contact with a surface of fastener 314 of lid 128 that is coupled to the sleeve body 130 via a hinge 342. In certain embodiments, couplings other than a hinge 342 can be used.

Figure 3C:
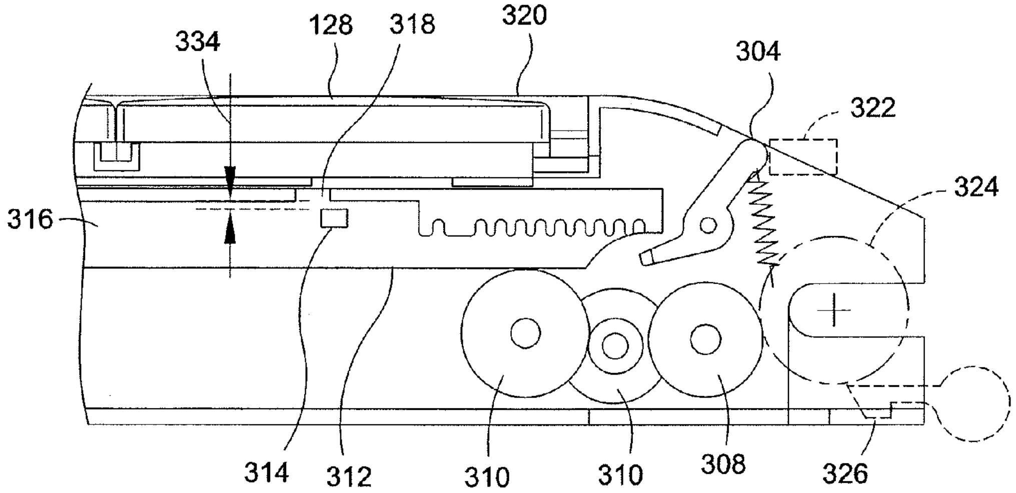
FIG. 3C illustrates another side cross-sectional view of a portion of the drawer of FIG. 2A, in the direction of arrow III-A.

FIG. 3C depicts the portion of the drawer of FIG. 3A in the direction of arrow III-A of FIG. 3A, wherein the drawer 120 has been loaded within the medication cabinet 100 and coupled to a drawer latch 326, located in the medication cabinet chassis 110. The lid 128 is held in a closed position by an inside wall of the chassis cavity 320.

An unlock stop 322 (illustrated in phantom), which is coupled to the medication cabinet chassis 110, pushed the lock lever 304 to a disengaged position as the drawer 120 was loaded within the medication cabinet 100. In this position, the driven gear 308 is engaged to the drive gear 324 of the medication cabinet chassis 110, and the drawer is coupled to the cabinet by the drawer latch 326. Each lid 128 is constrained downward into the closed position by an inside wall of a chassis cavity 320, providing clearance 334 between the lid fastener 314 and the slider 316. From this state, the linear position of the slider 316 can be adjusted, with minimal resistance, by the drive gear 324 through the driven gear 308, the gear train 310, and the gear rack 312 on the slider 316.

Specifically, rotation of the driver gear 324 by a motor (not illustrated) in the chassis, causes rotation of the driven gear 308 and gear train 310 in the drawer. Rotation of the gear train 310 causes longitudinal movement of the slider 316 by the gear rack 312. Longitudinal movement of the slider 316 will adjust the position of the aperture 318 in the slider 316 vis-à-vis the lid fastener 314, and when the aperture 318 is aligned with the fastener 314, the fastener 314 passes through the aperture 318, whereby the lid 128 is actuated from the closed position to the open position due to the load force provided by the lid spring 124 when the lid is not constrained downward by the inside wall of the chassis cavity 320 (e.g., when the drawer 120 is outside the cabinet). The use of a single slider 316 to provide access to a plurality of containers 150 to 164 by actuating their lids is a low complexity, low cost solution compared to other existing dispensing solutions. Also, the elimination of a motor, sensor, or other electronics in the drawer reduces complexity and sources for unreliability by eliminating any requirement for flexible cabling or electrical connections between the drawer and the cabinet.

Figure 3D:
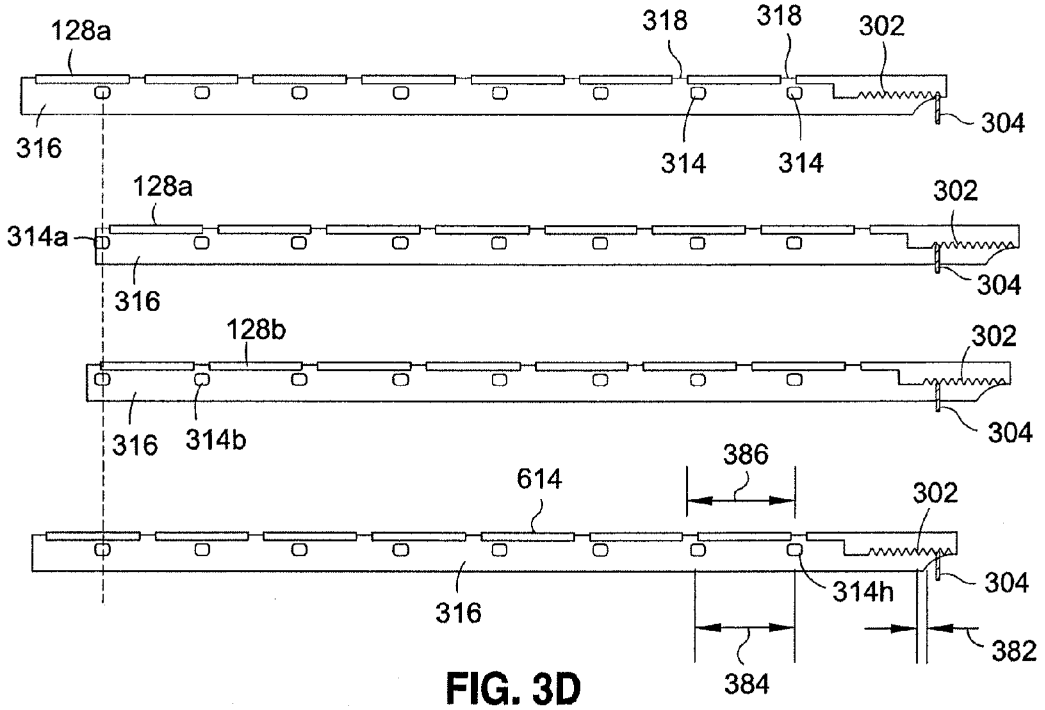
FIG. 3D illustrates a side cross-sectional view of slider configurations of the containers included in the drawer of FIG. 2A according to one embodiment, in the direction of arrow III-C.

FIG. 3D illustrates a side cross-sectional view of slider configurations of the containers included in the drawer of FIG. 2A in the direction of arrow 111-C of FIG. 2A, according to one embodiment. Specifically, the relationship between the position of the slider 316 and the lid fasteners 314 is highlighted. The slider 316 has nine slider detent positions 302 corresponding to nine possible positions for the slider 316: one for each of the fasteners 314 for the eight lids, and one slider detent position in which no lids are open. In the illustrated embodiment, only one lid 128 can open when the lid is not constrained downward by the inside wall of the chassis cavity 320 because only one fastener 314 can pass through an aperture 318 of the slider 316 due to the difference between pitch 386 of the slider 316 (e.g., the arrangement and position of the apertures 318 in the slider 316) and the pitch 384 of the lid fasteners 314 (e.g., the arrangement and position of the fasteners 314). This results in only one fastener 314 lining up with an aperture 318 at any position of the slider 316. The pitch 382 of the slider position detents 302 is approximately equal to the difference between the pitch 386 of the slider 316 and pitch 384 of the lid fasteners 314. The position of the slider 316 is controlled by the lock lever 304, which couples to the slider position detents 302 in one of the nine positions of the slider position detents 302.

Four positions of slider 316 are illustrated in FIG. 3D. In the first illustrated slider 316 position, lock lever 304 is coupled to the slider position detents 302 in a final position, causing no lids to open because none of the fasteners 314 line up with the apertures 318 of the slider 316. In the second illustrated slider 316 position, lock lever 304 is coupled to the slider position detents 302 in a first position, causing fastener 314*a* to align with an aperture in the slider 316 and allowing the lid 128*a* to open when the drawer is opened. In the third illustrated slider 316 position, lock lever 304 is coupled to the slider position detents 302 in a second position, causing fastener 314*b* to align with an aperture in the slider 316 and allowing the lid 128*b* to open. In the fourth illustrated slider 316 position, lock lever 304 is coupled to the slider position detents 302 in an eighth position, causing fastener 314*h* to align with an aperture in the slider 316 and allowing the lid associated with fastener 314*h* to open.

Figure 4:
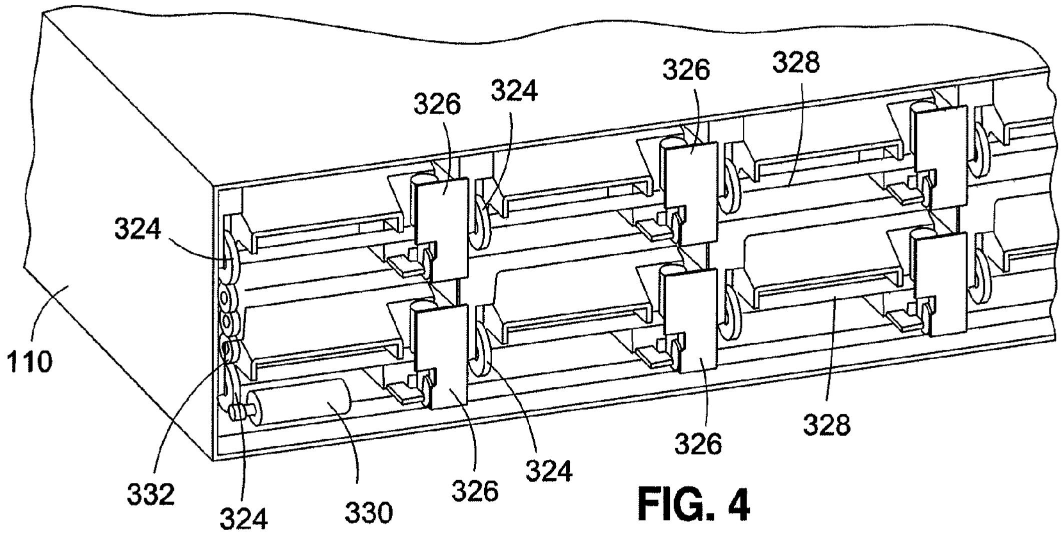
FIG. 4 illustrates a rear-view of a portion of the medication cabinet of FIG. 1, in the direction of arrow IV-A.

FIG. 4 illustrates a rear-view of a portion of the medication cabinet 100 of FIG. 1 in the direction of arrow IV-A of FIG. 1. The medication cabinet 100 includes drive shafts 328, drawer latch assemblies 326, and drive gears 324, as discussed above. The medication cabinet also includes idler gears 332 and a motor 330. The drive gears 324 for the drawers 120 are driven by the solitary motor 330 through a set of drive shafts 328 and idler gears 332. Advantageously, by having a single motor 330 responsible for driving the slider 316 for each drawer 120, the complexity of each drawer 120 is reduced because each drawer 120 does not require a motor. Consequently, the cost of producing each drawer is lowered. Alternately, additional motors can be utilized, such as, for example, one motor per row of drawers.

The motor 330 can be controlled by the computer system 101 mentioned with reference to FIG. 2A. Specifically, the motor 330 is electronically coupled to the computer system 101, which includes a processor configured to process instructions controlling activation of the motor 330. In addition to tracking the contents of the medication cabinet 100, the computer system 101 is configured to control access to the medication cabinet by authenticating a user, such as with a bar code scanner, fingerprint reader, or other form of identification input device. The motor 330 can be activated in response to an appropriate item selection after appropriate authentication of the user.

Figure 5:
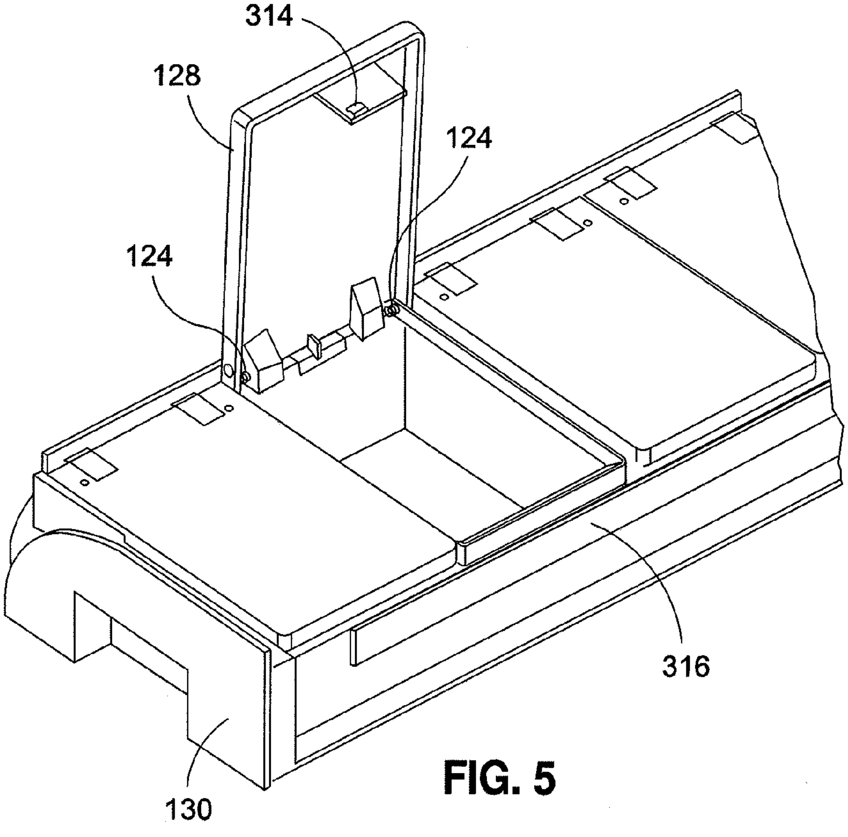
FIG. 5 illustrates a portion of the drawer of FIG. 2A in the direction of arrow V-A, with an exposed latch slider and all but one lid closed.

FIG. 5 illustrates a portion of a drawer 120 of FIG. 2A with an exposed latch slider 316. The latch slider 316 and related mechanisms can be coupled to either side of the drawer 120, depending on the needs of the user and the cabinet in which the drawer 120 is placed.

Figure 6A:
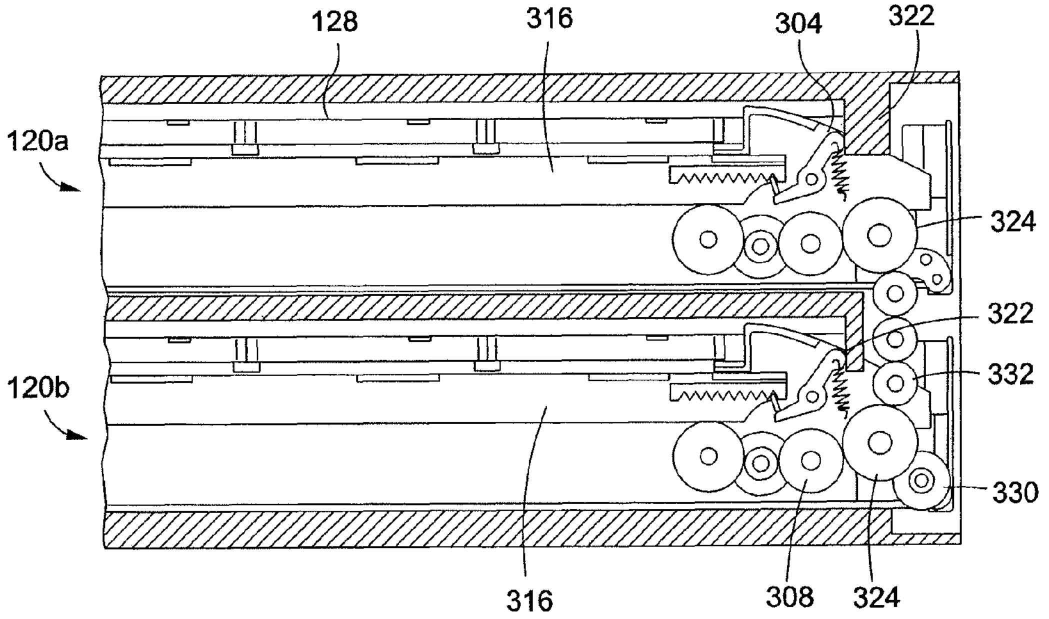
FIG. 6A illustrates a side cross-sectional view of a portion of a pair of drawers included in the medication cabinet of FIG. 1 in the direction of arrow VI-A, in standby mode.
Figure 6B:
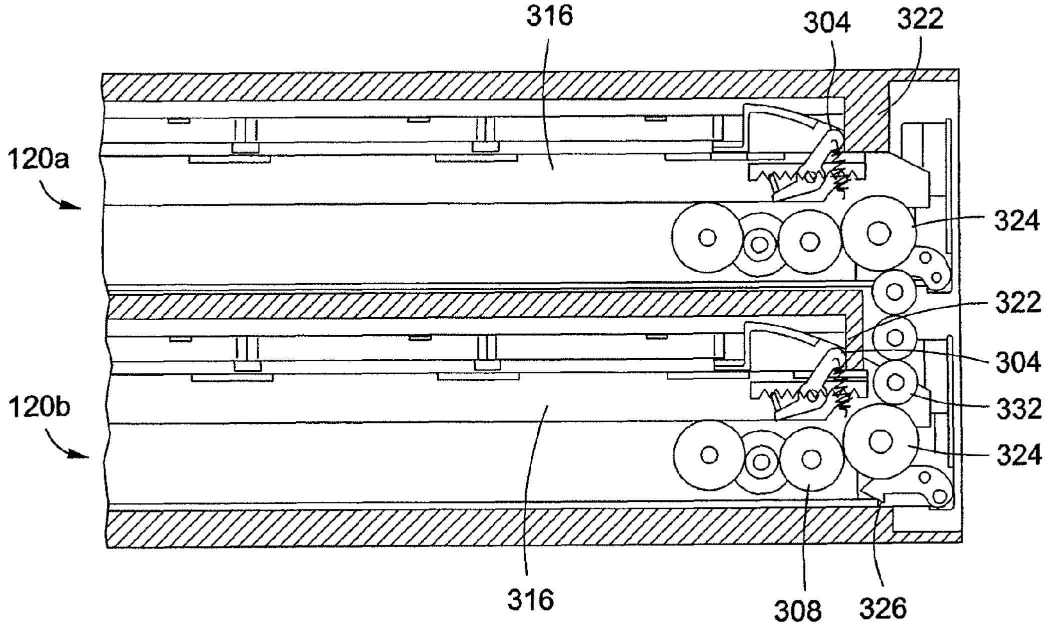
FIG. 6B illustrates a side cross-sectional view of the pair of drawers of FIG. 6A after access to a container has been provided.
Figure 6C:
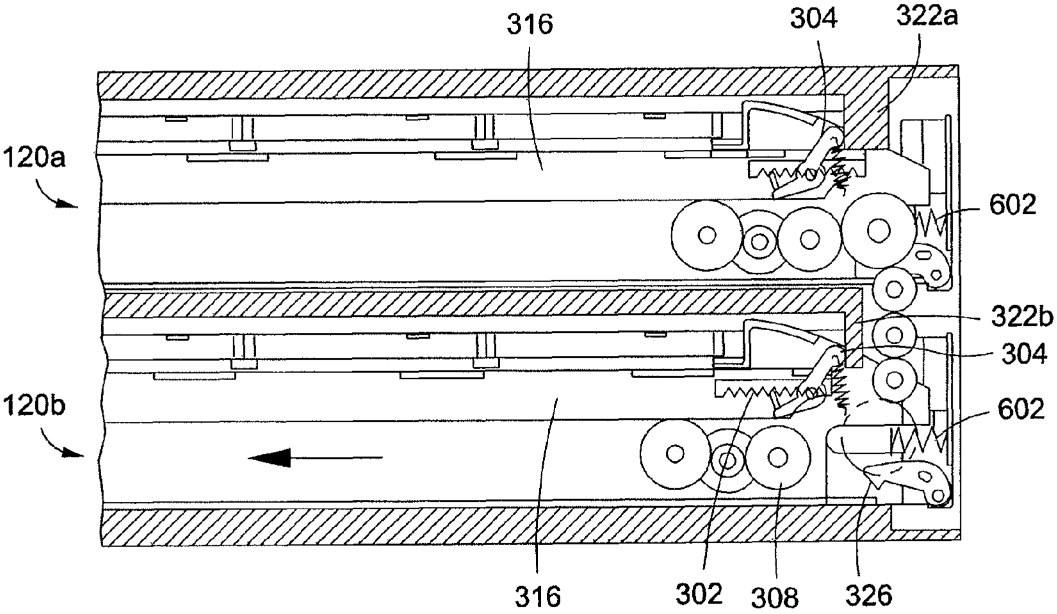
FIG. 6C illustrates a side cross-sectional view of the pair of drawers of FIG. 6A after the lower drawer has been released from the cabinet.

FIGS. 6A-6C illustrate the sequence of interaction between components of the chassis 110 and components of the drawers 120*a* and 120*b* in the direction of arrow VI-A of FIG. 1. Specifically, FIG. 6A illustrates a side cross-sectional view of a portion of a pair of drawers 120*a* and 120*b* in standby mode (e.g., before dispensing of an item from a drawer) included in the medication cabinet 100 of FIG. 1.

In standby mode, the slider 316 is in a position where each fastener (not illustrated) associated with a lid 128 of a container 150 to 164 is configured to be retained by the slider 316, thereby restricting access to the container 150 to 164. Because, however, each lid 128 is constrained downward by the inside wall of the chassis 110 cavity, the fasteners associated with each lid are not retained by the slider 316, so that the slider 316 can be freely driven to any other position. Additionally, each lock lever 304 is held in a disengaged position by the unlock stop 322 in the chassis 110.

FIG. 6B illustrates a side cross-sectional view of the pair of drawers 120*a* and 120*b* after the slider has been moved to enable access to a container. The position of each slider 316 is adjusted by corresponding drive gears 324 so that the fasteners 314 associated with only selected lids for certain ones of the containers 150 to 164 are aligned with apertures 318 in the sliders 316. Once the drawers are released from the constraint provided by the inside wall of the chassis 110 cavity, the lids 128 can be released into an open position, thereby providing access to the associated containers.

FIG. 6C illustrates a side cross-sectional view of the pair of drawers 120*a* and 120*b* after the lower drawer 120*b* has been released from the cabinet and from drawer latch 326. The compression spring 602 has pushed the lower drawer 120*b* forward (e.g., to the left) so that the lock lever 304 disengages from the unlock stop 322*b* and engages the slider position detent 302 of the lower drawer 120*b*. As a result, the proximal end of the lower drawer 120*b* (illustrated in FIG. 6D) protrudes from the front of the chassis 110, indicating to a user that the lower drawer 120*b* needs to be pulled out of the chassis 110.

Figure 6D:
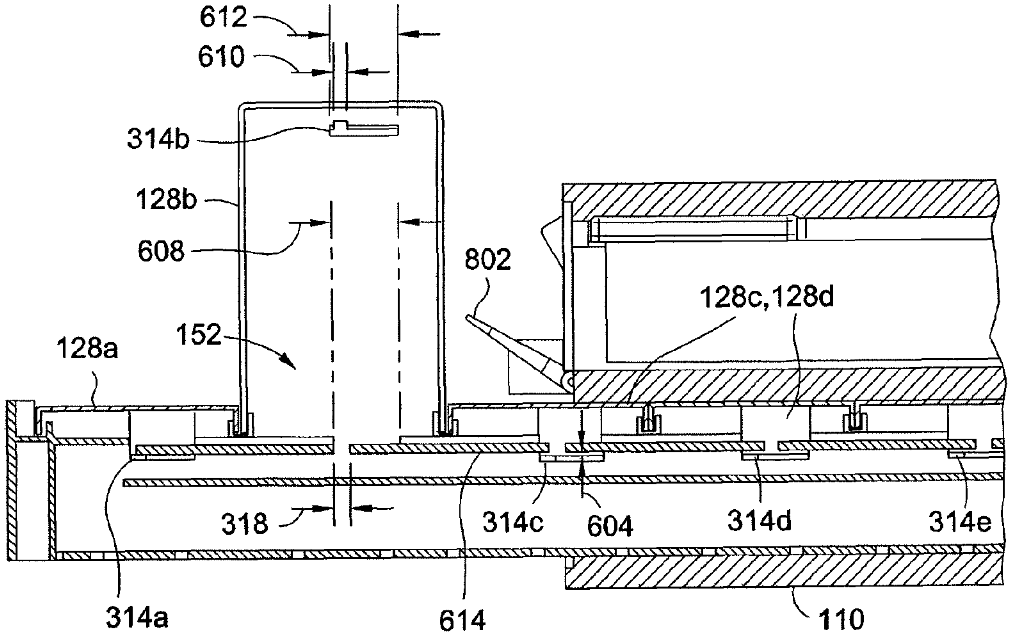
FIG. 6D illustrates a side cross-sectional view of another portion of the pair of drawers of FIG. 6B after access to the container has been provided.

FIG. 6D illustrates a side cross-sectional view of the proximal end of the pair of drawers 120*a* and 120*b* after the lower drawer 120*b* has been released from the cabinet. The lid 128*b* of the second container 152, no longer under the constraint provided by the inside wall of the chassis 110 cavity, is in an open position because the lid fastener 314*b* is in line 610 with an aperture 318 in the slider 314. Access is thereby provided to the associated container 152.

A user can stop pulling the lower drawer 120*b* away from the chassis 110 once the second container 152 is accessible by the user. Lids 128 that are not selected for accessibility (e.g., lid 128*b* of the second container 152) and that are not under the constraint provided by the inside wall of the chassis 110 cavity (e.g., lids outside the chassis 110 cavity, such as lid 128*a*) are held in a closed position by coupling of the wall 614 of the slider 314 with the lid fastener (e.g., fastener 314*a* of the first lid 128*a*). Lids that are inside the chassis 110 cavity (e.g., lids 128*c* and 128*d*) are held down by the inside wall of the chassis 110 cavity. As discussed above, lids held down by the inside wall of the chassis 110 create a gap 604 between the lid fastener (e.g., 314*c*, 314*d*, and 314*e*) and the wall 614 of the slider 314. After a selected container 152 has been accessed, the lower drawer 120*b* can be returned into the chassis 110 cavity by pushing (e.g., to the right) the drawer into the chassis 110 cavity. The lid closer 802, discussed in further detail below with reference to FIG. 8, will close a lid 128*b* from an open position when the lid 128*b* comes into contact with the lid closer 802 while the associated drawer 120*b* is being returned to the chassis 110 cavity. Once the lower drawer 120*b* is returned to the chassis 110 cavity, the lower drawer 120*b* is engaged by the drawer latch 326 (illustrated in FIG. 6B), after which the drive gear 324 will position the slider 316 in a configuration to restrict access to all containers 150 to 164 (e.g., a "close all" state) by placing the slider 316 in contact with the fastener 314 of each respective container 150 to 164.

Figure 7A:
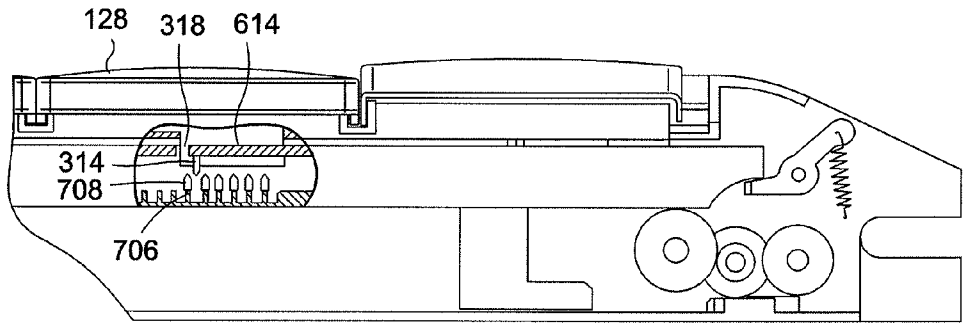
FIG. 7A illustrates an exposed sectional view of a portion of a drawer included in the medication cabinet of FIG. 1, in the direction of arrow VII-A.

FIG. 7A illustrates an exposed sectional view of a portion of a drawer 120 included in the medication cabinet of FIG. 1, in the direction of arrow VII-A of FIG. 1. In certain embodiments, the receptacles for each of containers 150 to 164 include a plurality of ribs 708 extending away from a surface of the receptacles, and the slider 316 also includes a plurality of projections 706 or "teeth." The slider projections 706 project from the inside of the slider 316 toward the surface of the receptacles of the containers 150 to 164 and towards the receptacle ribs 708. The receptacle ribs 708 and slider projections 706 assist with identifying and restricting unauthorized access to the containers 150 to 164, such as when an individual tries to remove an item in a container without proper authorization (e.g., stealing a narcotic medication).

Figure 7B:
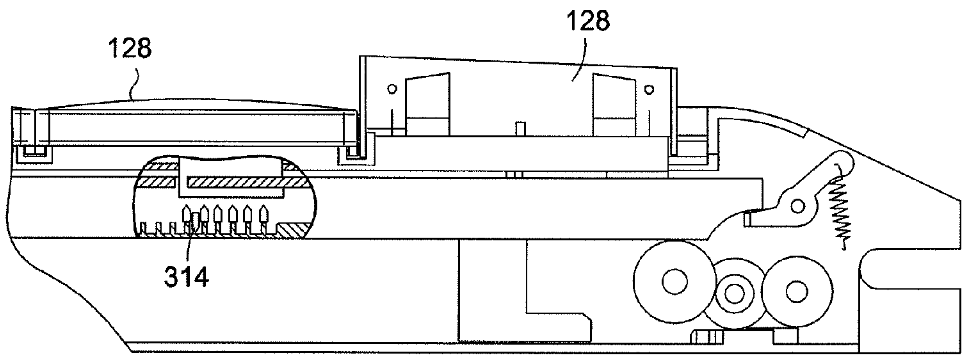
FIG. 7B illustrates the exposed sectional view of a portion of the drawer of FIG. 7A after a lid has been forced open.

FIG. 7B illustrates another exposed sectional view of a portion of the drawer of FIG. 7A after a lid has been forced open. If an attempt to force the lid 128 into an open position is made without passing the lid fastener 314 through an aperture 318 in the wall 614 of the slider 316, the fastener 314 is decoupled from the lid 128 and falls between receptacle ribs 708 and slider projections 706, thereby restricting longitudinal movement (e.g., movement left or right) of the slider 316. For example, the fastener 314 may break off the lid 128 if enough upward force is applied from the fastener 314 against the slider wall 614 while the lid 128 is attempted to be forced open. By restricting longitudinal movement of the slider 316, authorized access to other containers will be restricted as the slider 316 will not be able to adjust to allow fasteners 314 associated with other containers to pass through apertures 318 in the slider wall 614.

Figure 7C:
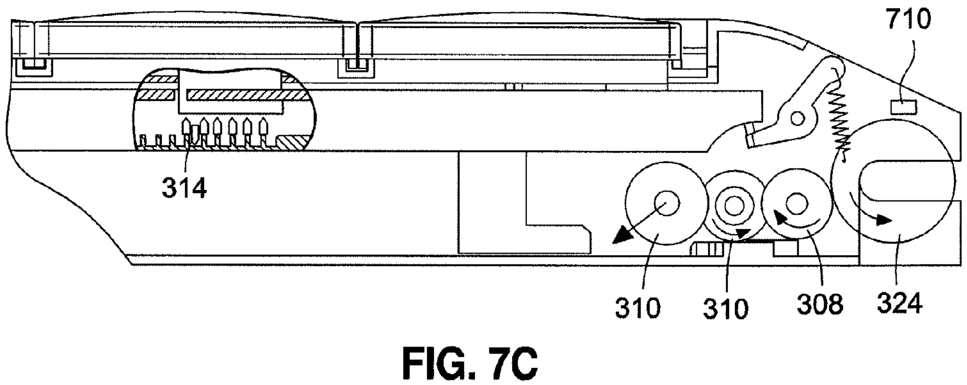
FIG. 7C illustrates another exposed sectional view of a portion of the drawer of FIG. 7A connected to the drive gear of the medication cabinet chassis, and after the lid has been forced open.

FIG. 7C illustrates another exposed sectional view of a portion of the drawer of FIG. 7A after the lid has been forced open, and in which a home sensor 710 coupled to the chassis is included. The home sensor 710 is configured to detect the position of the slider 316 while the drawer is latched to the chassis. In certain embodiments, the home sensor 710 can command a longitudinal position of the slider 316. During normal operation (e.g., when the lid 128 is open and closed by passing the fastener 314 through the aperture 318 in the wall 614 of the slider 316), the home sensor 710 detects when the slider 316 has returned to a "home" position when the drawer 120 is returned to the chassis 110 cavity and is engaged by the drawer latch 326 (illustrated in FIG. 6B). If, however, the fastener 314 is decoupled from the lid 128 and falls between receptacle ribs 708 and slider projections 706, the restricted longitudinal movement (e.g., movement left or right) of the slider 316 inhibits the slider 316 returning to the home position when the drawer 120 is returned to the chassis 110 cavity. Consequently, the home sensor 710 will detect that the slider 316 is not in a home position. In certain embodiments, if the home sensor 710 does not detect that the slider 316 is in a home position in a certain amount of time, a time-out error condition may occur in which a visual, audible, or electronic alert is issued. For example, a warning message can be transmitted to proper administrative personnel.

In certain embodiments, in order to prevent damage to drive components (e.g., gear train 310, driven gear 308, and drive gear 324), the gear train 310 will become disengaged when the fastener 314 is decoupled from the lid 128 and falls between receptacle ribs 708 and slider projections 706.

Figure 8A:
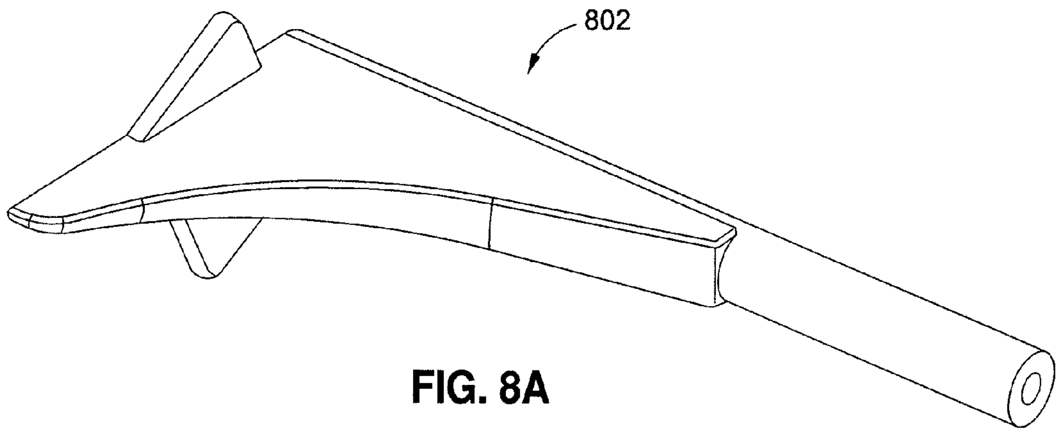
FIG. 8A illustrates a lid closer according to one embodiment.
Figure 8B:
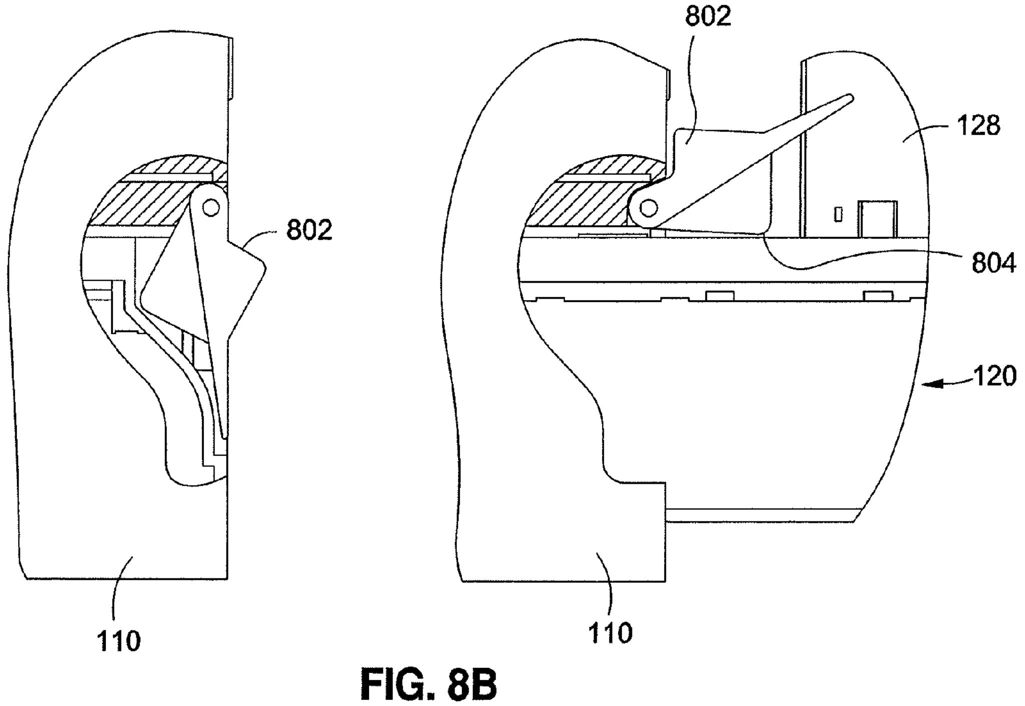
FIG. 8B illustrates the lid closer of FIG. 8A attached to a portion of the medication cabinet of FIG. 1, in the direction of arrow VIII-A, with a drawer in various positions.

FIG. 8A illustrates in isolation a lid closer 802 according to one embodiment, having been previously shown in FIG. 6D. The lid closer 802 has a curved surface for minimizing the impact of closing forces on a lid 128, while also facilitating closing of a lid 128 by the lid closer 802. FIG. 8B illustrates the lid closer 802 of FIG. 8A attached to the chassis 110 of the medication cabinet of FIG. 1.

The lid closer 802 is loosely coupled to the chassis 110 so as to freely pivot about an axis of the lid closer 802. Consequently, the lid closer 802 falls into a "down" or low profile position due to the force of gravity when the drawer 120 is returned into the chassis 110 cavity. An edge of the lid closer 802 is pushed away and up from the chassis 110 by the motion of the drawer 120 when the drawer 120 is pulled out from the chassis 110 cavity. The lid closer 802 facilitates closing of a lid 128 in an open position on a container in a drawer 120 by the curved surface of the lid closer 802 coming into contact with the lid 128 as the drawer 120 is returned into the chassis 110 cavity.

Figure 9A:
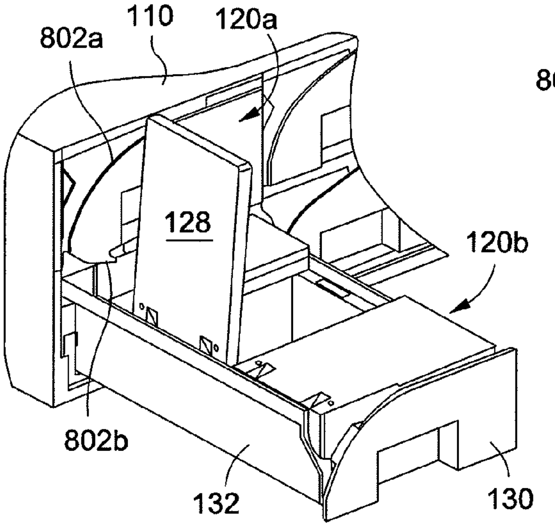
FIGS. 9A-9D illustrate different stages of a lid being closed by the lid closer of FIG. 8A, in the direction of arrow IX-A in FIG. 1.
Figure 9B:
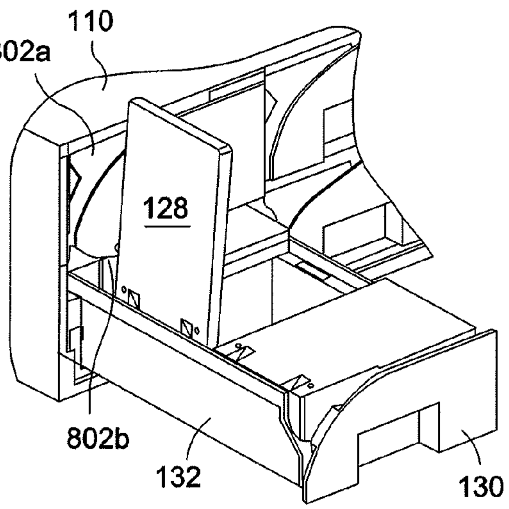
Figure 9C:
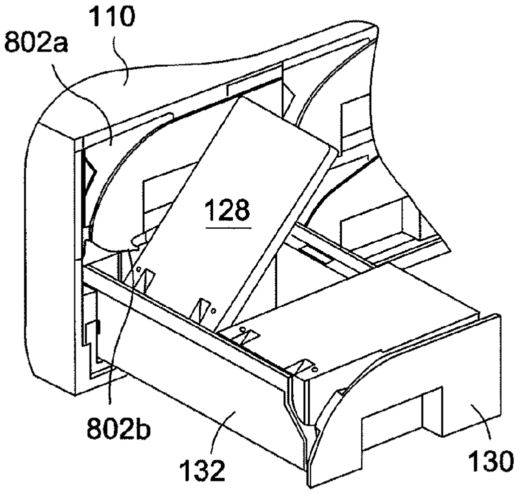
Figure 9D:
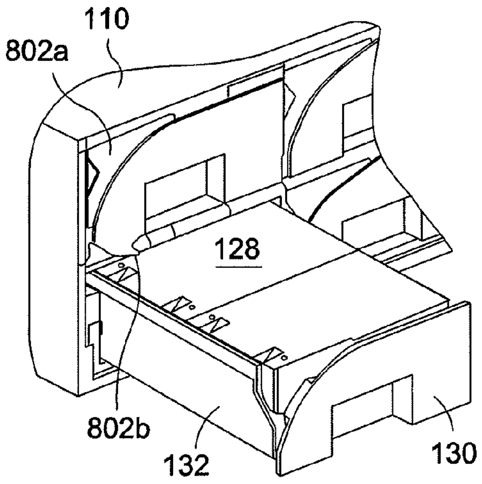

FIGS. 9A-9D illustrate different stages of a lid being closed by the lid closer of FIG. 8A. Two lid closers 802*a* and 802*b* are illustrated. Lid closer 802*a* is configured to facilitate the closing of lids 128 associated with the upper drawer 120*a*, and lid closer 802*b* is configured to facilitate the closing of lids 128 associated with the lower drawer 120*b*. Lid closer 802*a* remains in a stowed state as the upper drawer 120*a* associated with lid closer 802*a* is not removed from the chassis 110 cavity. In FIG. 9A, lid 128 is in an open state and lid closer 802*b* is in a deployed state, but not in contact with lid 128. In FIG. 9B, lid 128 has come into initial contact with deployed lid closer 802*b*. In FIG. 9C, lid 128 has contacted and passed upon a portion of the curved surface of deployed lid closer 802*b*, causing lid 128 to move from an open state to a near closed state. In FIG. 9D, lid 128 has contacted and passed upon the entire curved surface of deployed lid closer 802*b*, causing lid 128 to move into a closed state.

Figure 10A:
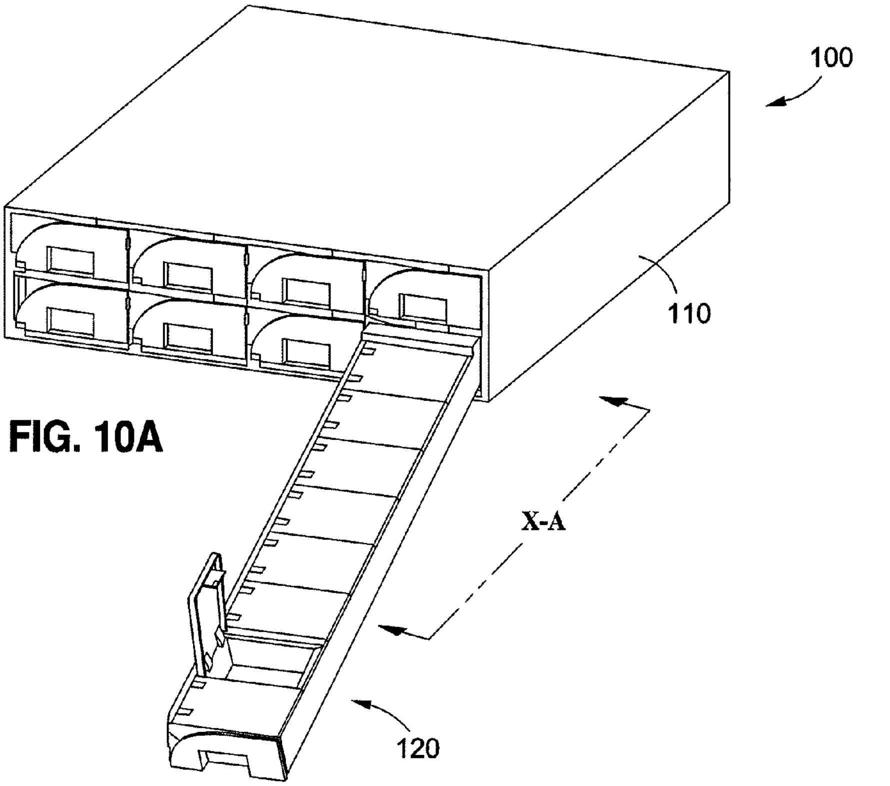
FIG. 10A illustrates the medication cabinet of FIG. 1 with a drawer tilted downwardly according to one embodiment.

FIG. 10A illustrates the medication cabinet 100 of FIG. 1 with a drawer 120 tilted downwardly from the chassis 110 according to one embodiment. By allowing a drawer 120 to tilt down, accessibility to containers in the drawer from a height below the drawer portal to the chassis 110 is increased. For example, a user may require such enhanced access if the medication cabinet 100 is very tall and/or the drawer 120 is located at a height above the user's eye-level. In certain embodiments, the drawer 120 may tilt down naturally due to the force of gravity while the drawer 120 is removed from the chassis 110 cavity.

Figure 10B:
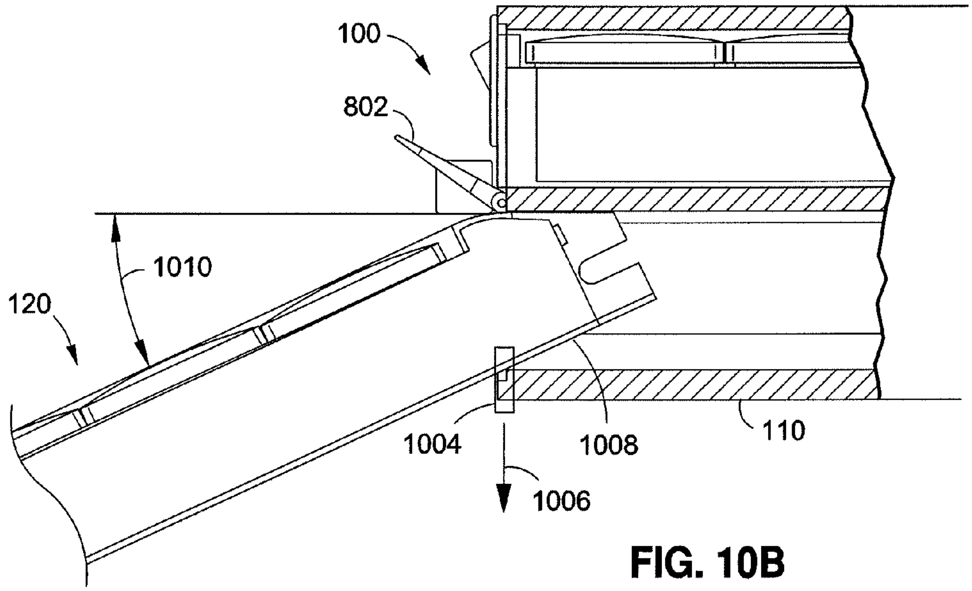
FIG. 10B illustrates a side cross-sectional view of the drawer of FIG. 10A in the tilted position, in the direction of arrow X-A.

FIG. 10B illustrates a side cross-sectional view of the drawer of FIG. 10A in the tilted position, in the direction of arrow X-A of FIG. 10A. The shape 1008 of the distal end of the drawer 120 is configured to limit the amount of tilt 1010 of the drawer 120 to an optimal value for user access.

Figure 11A:
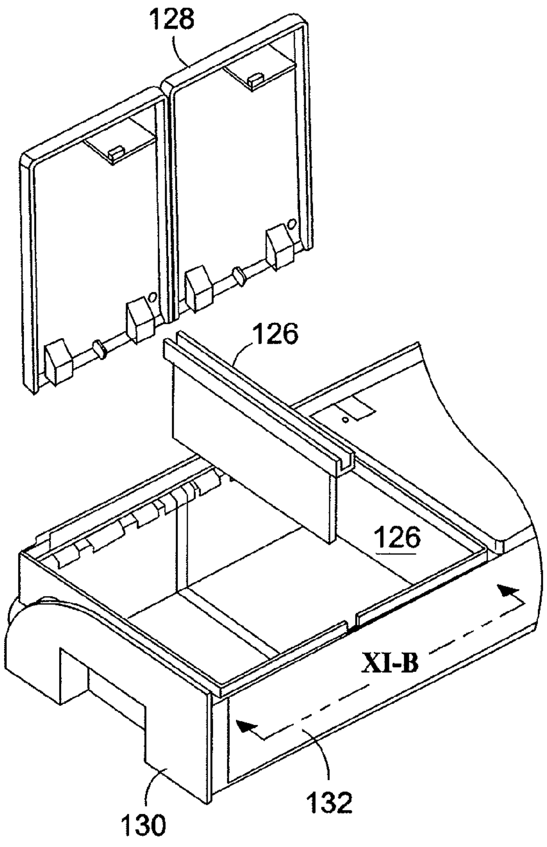
FIG. 11A illustrates a lid and divider, unattached for reconfiguration, included in the drawer of FIG. 2A in the direction of arrow XI-A, according to one configuration.
Figure 11B:
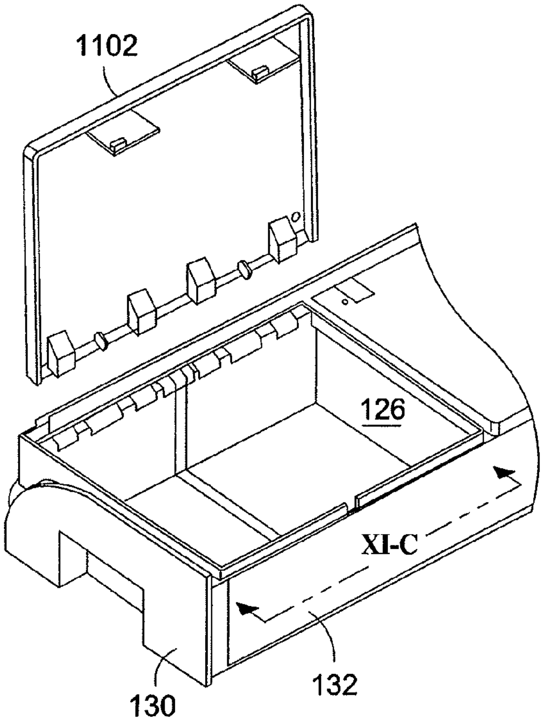
FIG. 11B illustrates another lid, unattached for reconfiguration, for the drawer of FIG. 2A in the direction of arrow XI-A, according to another configuration.

FIG. 11A illustrates a lid and divider, unattached for reconfiguration, included in the drawer of FIG. 2A in the direction of arrow XI-A of FIG. 2A, according to one configuration in which the container can be reconfigured from a first size to a second size. When two single width lids 128, each for a separate container, are in an open state, the two single width lids 128 and a divider 126 are removed (e.g., by snapping the lids off of the drawer 120) as illustrated in FIG. 11A. The two single width lids 128 are replaced by a double width lid 1102 which is coupled to the drawer 120 (e.g., by snapping the double width lid 1102 onto the drawer 120), as illustrated in FIG. 11B. Two lids can be open at the same time if the drawer 120 is removed from the chassis 110, or if the slider 316 has placed all the lids into an open state provided by the optional slider 316 configuration shown in FIG. 12B.

Figure 11C:
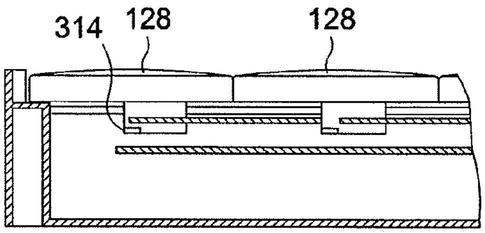
FIG. 11C illustrates a side cross-sectional view of the container configuration of FIG. 11A with lids closed, in the direction of arrow XI-B.
Figure 11D:
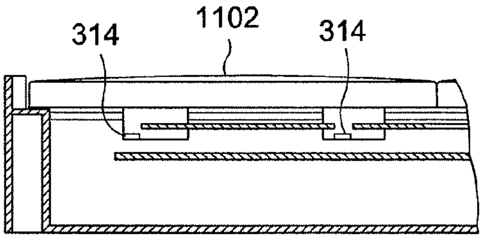
FIG. 11D illustrates a side cross-sectional view of the container configuration of FIG. 11B with the lid closed, in the direction of arrow XI-C.

FIG. 11C illustrates a side cross-sectional view of the container configuration of FIG. 11A with lids closed, in the direction of arrow XI-B, and FIG. 11D illustrates a side cross-sectional view of the container configuration of FIG. 11B with the lid closed, in the direction of arrow XI-C. Specifically, FIG. 11C illustrates that a single position for the slider 316 restricts access to one of two single width lids 128 vis-à-vis their associated fasteners 314. FIG. 11D illustrates that the same position for the slider 316 allows access to a double width lid 1102.

Figure 12A:
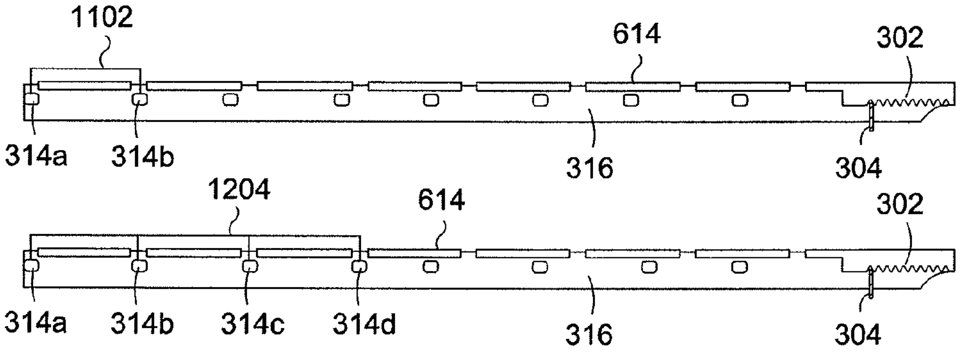
FIG. 12A illustrates a side cross-sectional view of a slider configuration of the containers included in a drawer included in the medication cabinet of FIG. 1 in the direction of arrow III-C, according to another embodiment in which different various different lids sizes and lid fastener configurations are used.

FIG. 12A illustrates a side cross-sectional view of a slider configuration of the containers included in a drawer included in the medication cabinet of FIG. 1 in the direction of arrow III-C, according to another embodiment in which different various different lids sizes and lid fastener configurations are used. Two positions of slider 316 are illustrated. In the upper illustrated slider 316 position, lock lever 304 is coupled to the slider position detents 302 in a first position, causing fasteners 314*a* and 314*b* to align with apertures in the slider 316 and allowing the double width lid 1102 to open. In the lower illustrated slider 316 position, lock lever 304 is again coupled to the slider position detents 302 in a first position, causing fasteners 314*a*, 314*b*, 314*c*, and 314*d* to align with apertures in the slider 316 and allowing an exemplary quadruple width lid 1204 to open.

Figure 12B:
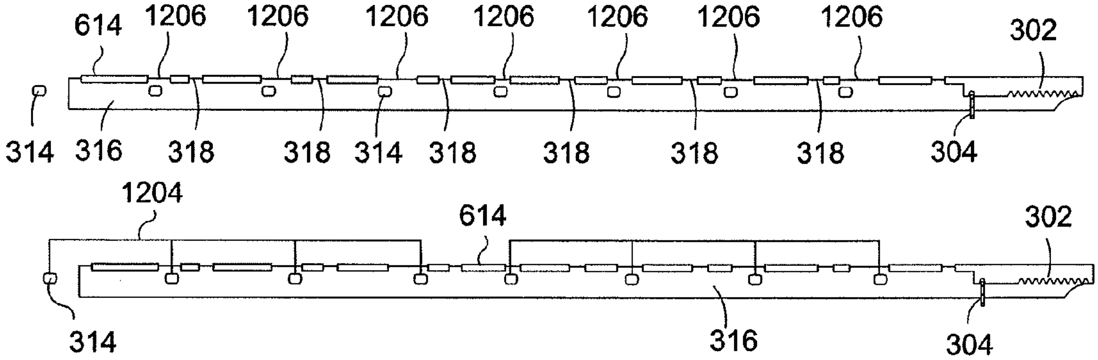
FIG. 12B illustrates a side cross-sectional view of a different slider configuration of the containers included in a drawer included in the medication cabinet of FIG. 1 in the direction of arrow III-C, according to a further embodiment in which the slider has a set of apertures to open all lids simultaneously.

FIG. 12B illustrates a side cross-sectional view of a different slider configuration of the containers of FIG. 12A in the direction of arrow III-C of FIG. 2A, in which the slider has a set of apertures to open all lids 128 simultaneously. Two configurations of slider 316 are illustrated. In the upper illustrated slider 316 configuration, lock lever 304 is coupled to the slider position detents 302 in a first (e.g., "all-open") position, causing the fasteners to align with apertures 1206 in the slider 316 and allowing all double width lids 1102 (not illustrated) to open. An all-open position may be useful if a user wants to load items in all containers of the drawer 120 at once, or if the user wants to reconfigure the container with different lid sizes without removing the drawer from the chassis 110. Alternatively, the lock lever 304 can be coupled to the slider position detents 302 in another position (not illustrated), causing two fasteners to align with two apertures 318 in the slider 316 and allowing one double width lid 1102 (not illustrated) to open.

In the lower illustrated slider 316 configuration, lock lever 304 is again coupled to the slider position detents 302 in a first, all-open position, causing the fasteners to align with apertures 1206 in the slider 316 and allowing all quadruple width lids 1204 (not illustrated) to open. Alternatively, the lock lever 304 can be coupled to the slider position detents 302 in another position (not illustrated), causing four fasteners to align with four apertures 318 in the slider 316 and allowing one quadruple width lid 1204 (not illustrated) to open.

Figure 13:
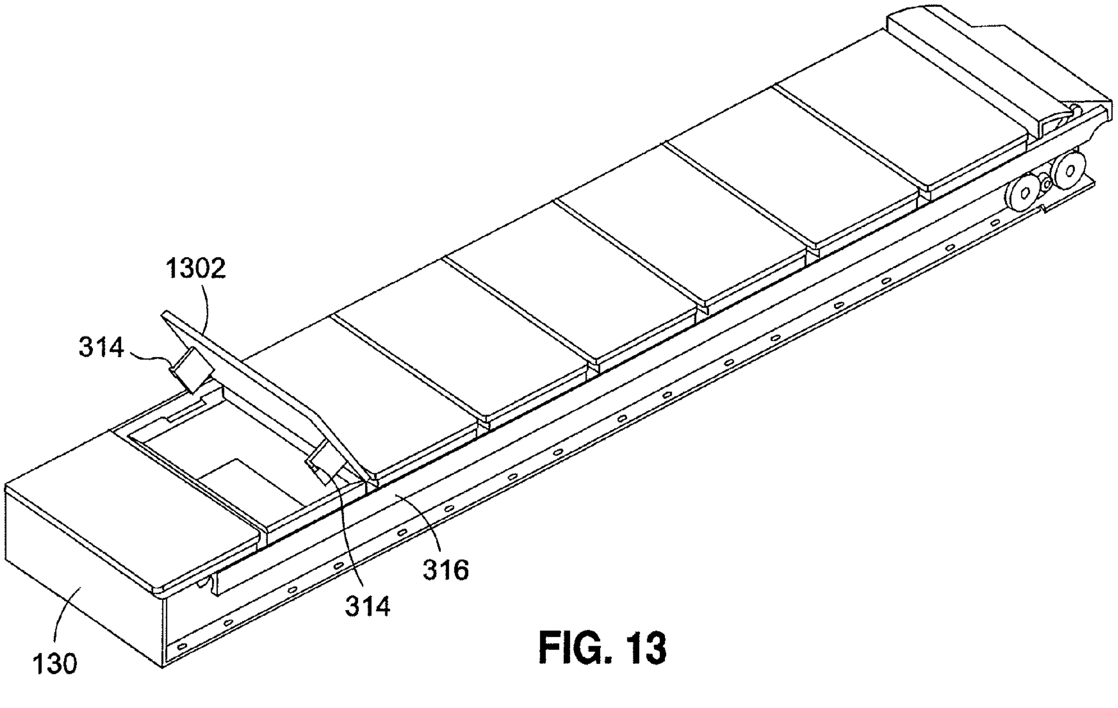
FIG. 13 illustrates a drawer included in the medication cabinet of FIG. 1 according to another embodiment.

FIG. 13A illustrates a drawer included in the medication cabinet of FIG. 1 according to another embodiment. The lid 1302 of the drawer 120 pivots from the rear, and closes by pivoting toward the proximal end of the drawer 120. Fasteners 314 are included on both sides of the lid 1302. An additional slider mechanism can be included to facilitate use of both fasteners 314. The additional slider mechanism can be configured to be driven synchronously with the first slider 316, such as by using a shaft (not illustrated). There are several advantages to a lid 1302 that pivots in this fashion, including the simplification of closing the lid, such as without lid closer 802, and making a container more accessible from multiple sides.

Figure 14A:
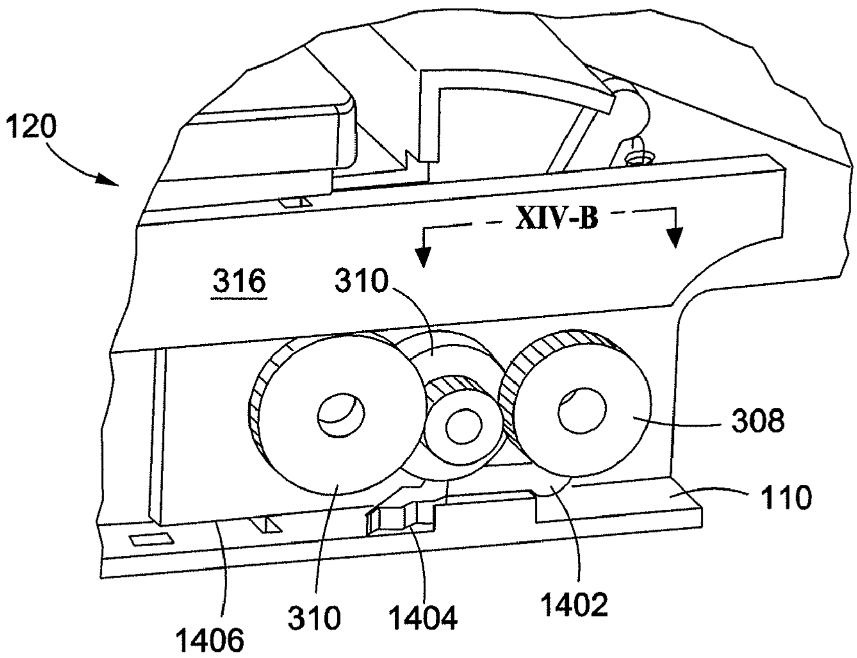
FIG. 14A illustrates a perspective cross-sectional view of a portion of the drawer of FIG. 2A in the direction of arrow XIV-A, with a drawer stop lever retracted.
Figure 14B:
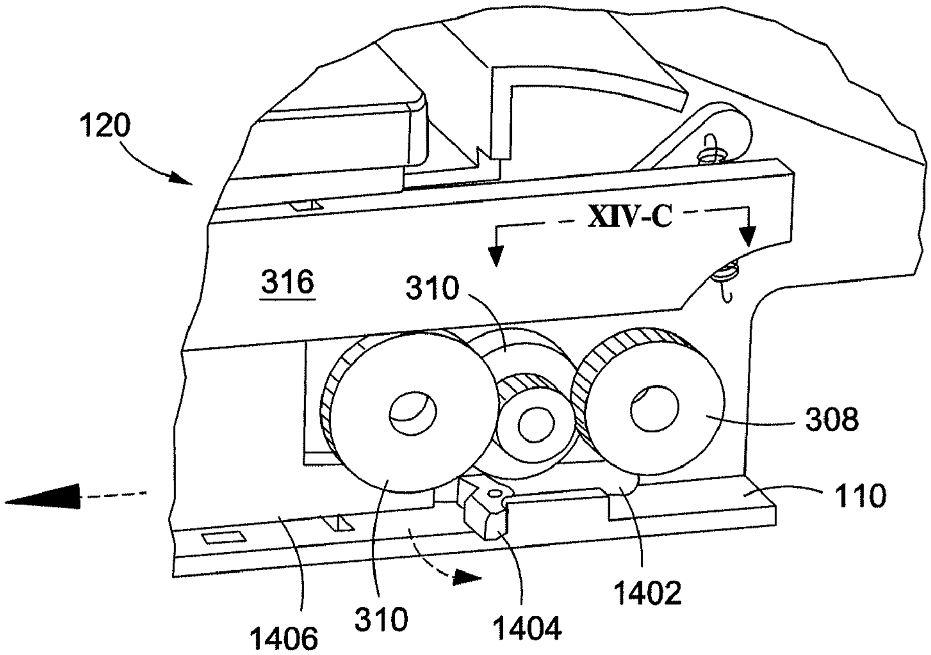
FIG. 14B illustrates a perspective cross-sectional view of the portion of the drawer of FIG. 14A with the drawer stop lever deployed.
Figure 14C:
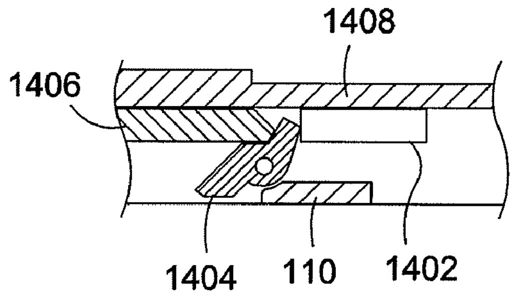
FIG. 14C illustrates a top cross-sectional view of a portion of FIG. 14A in the direction of arrow XIV-B of FIG. 2A.
Figure 14D:
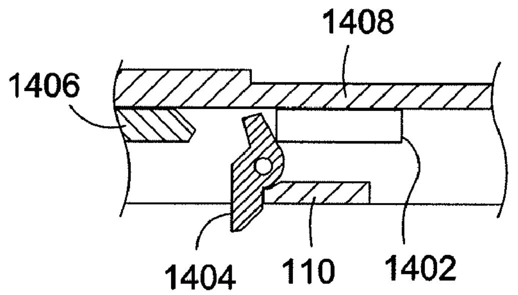
FIG. 14D illustrates a top cross-sectional view of a portion of FIG. 14B in the direction of arrow XIV-C of FIG. 2A.
Figure 15:
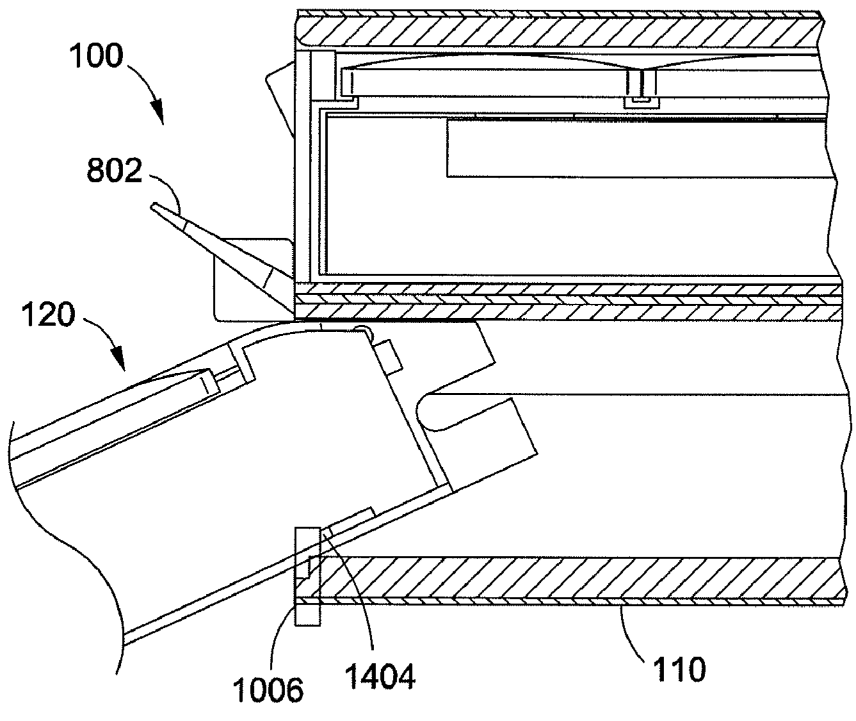
FIG. 15 illustrates a side cross-sectional view of a portion of the medication cabinet of FIG. 1 with a drawer held by a chassis stop, in the direction of arrow X-A of FIG. 10A, according to one embodiment.

In certain embodiments, removal of a drawer 120 from the medication cabinet 100 by unauthorized users is restricted using a drawer stop lever 1404 illustrated in FIG. 14A, while removal by authorized users, such as for repair and/or replacement, is facilitated using the drawer stop lever 1404. FIGS. 14A-15 illustrate a configuration for implementing a drawer stop lever 1404 that is deployable by positioning the slider 316 away from the "home" position, i.e., when the drawer 120 is returned to the chassis 110 cavity and is engaged by the drawer latch 326.

FIG. 14A illustrates a perspective cross-sectional view of a portion of the drawer of FIG. 2A in the direction of arrow XIV-A of FIG. 2A, with a drawer stop lever 1404 retracted. When the drawer 120 rests in the chassis 110 cavity and the drawer 120 is not in use, the slider 316 would normally be in the "home" position. In this position, the drawer stop lever 1404 may be retracted, as illustrated in FIG. 14A. FIG. 14C illustrates a top cross-sectional view of a portion of FIG. 14B in the direction of arrow XIV-B of FIG. 2A. A spring 1402 is coupled to the drawer stop lever 1404 to facilitate deployment of the drawer stop lever 1404 as required.

The slider 316 would not be in a home position, e.g., the slider 316 may be positioned somewhat forward of the home position, if authorized access to any of the pockets has been granted. When the slider 316 is not in a home position, the drawer stop lever 1404 may be deployed, as illustrated in FIG. 14B, which illustrates a perspective cross-sectional view of the portion of the drawer of FIG. 14A with the stop lever deployed, to inhibit removal of the drawer 120 from the medication cabinet 100. FIG. 14D illustrates a top cross-sectional view of a portion of FIG. 14B in the direction of arrow XIV-C of FIG. 2A. The spring 1402 has advantageously deployed the drawer stop lever 1404 as the opposing force provided by the slider tab 1406 restricting the drawer stop lever 1404 from being deployed has been removed.

FIG. 15 illustrates a side cross-sectional view of a portion of the medication cabinet of FIG. 1 in the direction of arrow X-A of FIG. 10A, with a drawer 120 held by a chassis stop 1006 according to one embodiment. In certain embodiments, the drawer 120 is restricted from being removed by a surface of deployed drawer stop lever 1404, which extends away from the drawer 120 and is located at the distal end of the drawer 120, coming into contact with chassis drawer stop 1006. If the drawer 120 needs to be removed from the chassis 110 completely, the chassis drawer stop 1006 may be removed by displacing the chassis drawer stop 1006 downward. In certain embodiments, the chassis drawer stop 1006 can be removed electronically, such as by an internal electromechanical latch. Consequently, the drawer stop lever 1404 will not come into contact with a surface of the chassis 110 that inhibits removal of the drawer 120 from the chassis 110. If the drawer stop lever 1404 is not deployed, the drawer 120 can be removed from the chassis 110 as the drawer stop lever 1404 will not come into contact with a surface of the chassis 110.

Figure 16:
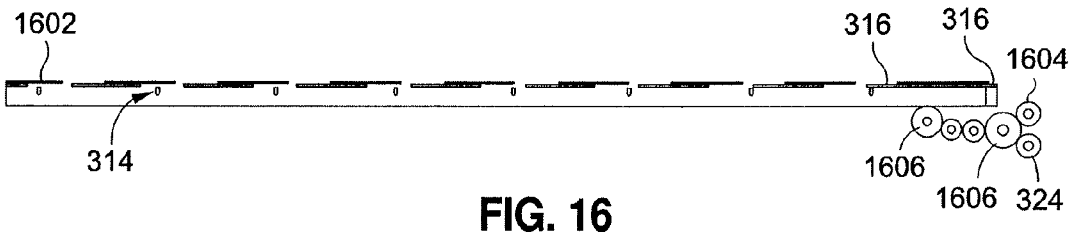
FIG. 16 illustrates a side cross-sectional view of slider configurations of the drawer of FIG. 2A in the direction of arrow XVI-A, according to another embodiment.

FIG. 16 illustrates a side cross-sectional view of slider configurations of the drawer 120 included in the drawer of FIG. 2A in the direction of arrow XVI-A of FIG. 2A, according to another embodiment, in which two sliders, an upper slider 1602 and a lower slider 316, an upper drive gear 1604, and a dual gear train 1606, are included.

The dual-slider embodiment allows for sequential access of containers 150 to 164 (not illustrated in FIG. 16). The operation of the sliders is similar to the embodiments discussed above, except that an additional slider, upper slider 1602, has been included with slider 316, here as lower slider 316. An upper drive gear 1604 and dual gear train 1606 has been included to facilitate movement of upper slider 1602 with lower slider 416. Each of upper slider 1602 and lower slider 316 has its own independent drive train.

Figure 17:
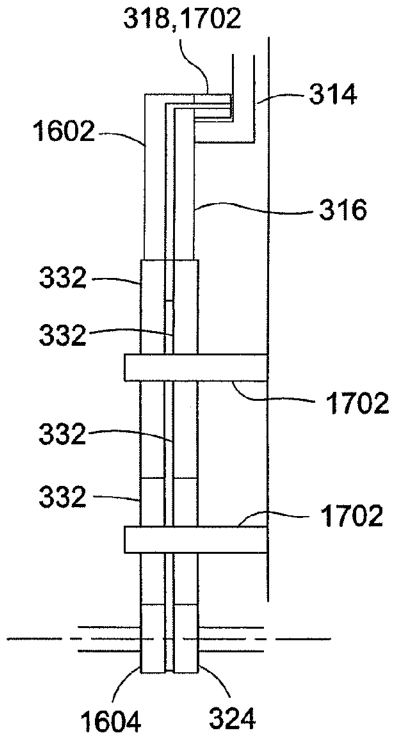
FIG. 17 illustrates a rear cross-sectional view of FIG. 16 in the direction of arrow XVI-B.

FIG. 17 illustrates a rear cross-sectional view of FIG. 16 in the direction of arrow XVI-B of FIG. 16. FIG. 17 illustrates that the lower slider 316 sits below and to the side of the upper slider 1602. Two independent gear trains can utilize common idler shafts 1702 and be driven by two separate drive gears 1604 and 324, respectively.

Figure 18A:
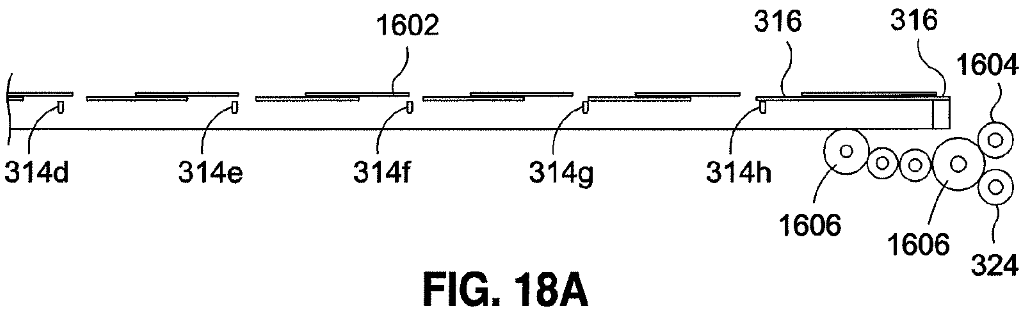
FIG. 18A illustrates a closer side cross-sectional view of FIG. 16.
Figure 18B:
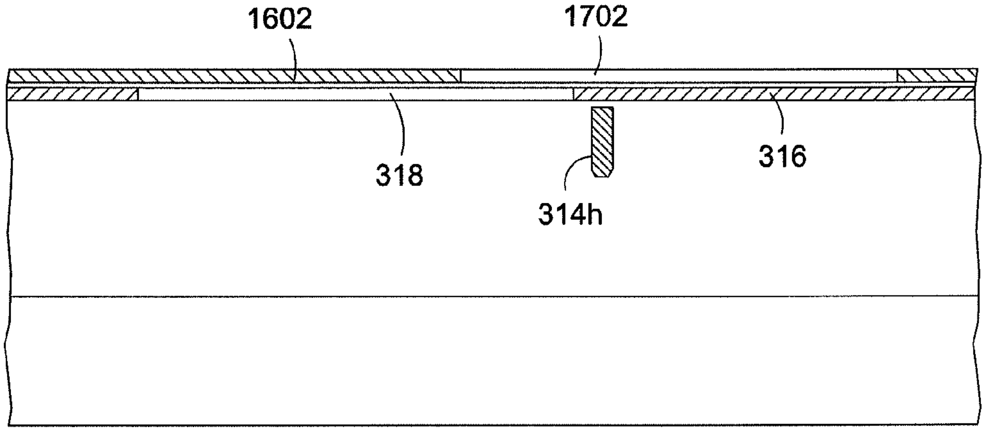
FIG. 18B illustrates a closer side cross-sectional view of FIG. 18A.

FIG. 18A illustrates a closer side cross-sectional view of FIG. 16, and FIG. 18B illustrates a closer side cross-sectional view of FIG. 18A. The illustrated embodiment is configured to select any set of sequential lids for actuation into an open state from a closed state by using one of either upper slider 1602 or lower slider 316 to determine the first lid in the sequence, and the remaining slider of upper slider 1602 or lower slider 316 to select the last lid in the sequence. In FIG. 18A, lids associated with fasteners 314*f* and 314*g* are selected to open. The upper slider 1602 blocks all fasteners (e.g., fasteners 314*d* and 314*e*) to the left of fastener 314*f* while the lower slider 316 blocks all the fasteners (e.g., fastener 314*h*) to the right of fastener 314*g*. Specifically, fasteners 314*d* and 314*e* are coupled to, and blocked from passing associated lids into open states, by upper slider 1602. Fastener 314*h* is coupled to, and blocked from passing an associated lid into an open state, by lower slider 316. Therefore, and as illustrated in FIG. 18B, fastener 314*h* cannot pass through the aperture 318 in the lower slider 316 or the aperture 1702 in the upper slider 1602. Fasteners 314*f* and 314*g* are not coupled to either upper slider 1602 or lower slider 316, and therefore their corresponding lids, which restrict access to sequential containers, can pass into an open state by passing through an aperture in either upper slider 1602 or lower slider 316. The pitch of the slider 316 and the fasteners 314 can be adjusted to determine how many lids 128 are in an open state at any one configuration of upper slider 1602 and lower slider 316.

The functionality of a dual-slider embodiment would be useful for single-dose-dispensing applications where several pockets in the same drawer each contain a single unit dose/serving of the same medication/item. Multiple doses of the medications can be removed or replenished in a single drawer access procedure. Efficient replenishment can be achieved by controlling the order in which doses are dispensed from the drawer so that empty pockets for a given medication are always in sequential containers.

Figure 19A:
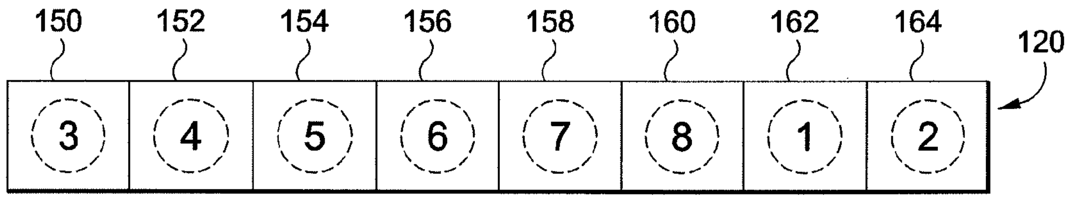
FIGS. 19A-19C illustrate schematic representational top views of a portion of the drawer of FIG. 2A in various states of contents replenishment, in the direction of arrow XIX-A.
Figure 19B:
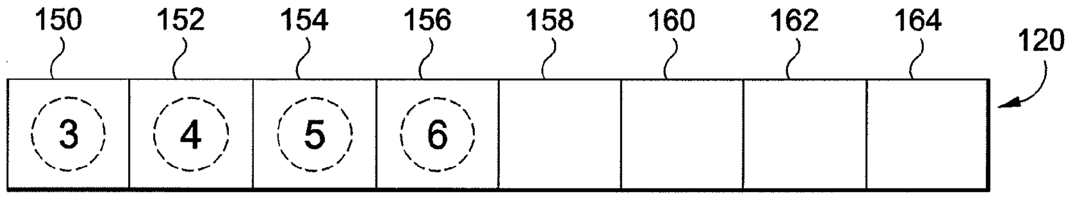
Figure 19C:
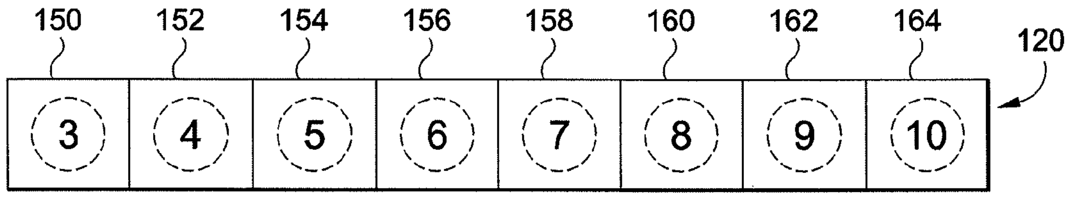
Figure 20A:
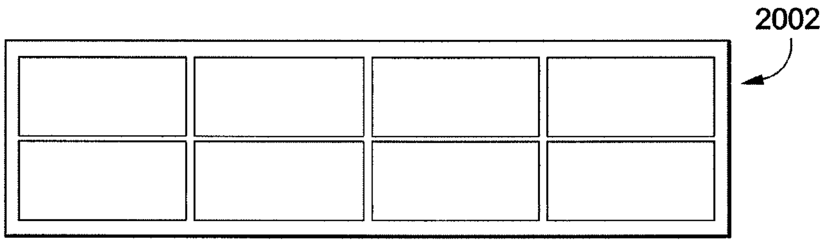
FIGS. 20A-F illustrate various configurations for a medication cabinet according to certain embodiments.
Figure 20B:
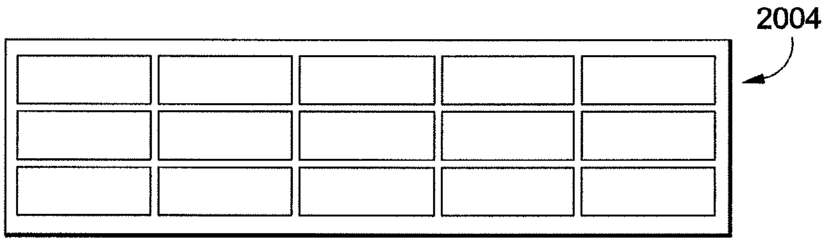
Figure 20C:
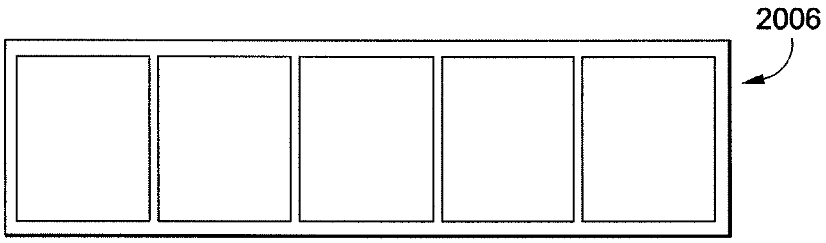
Figure 20D:
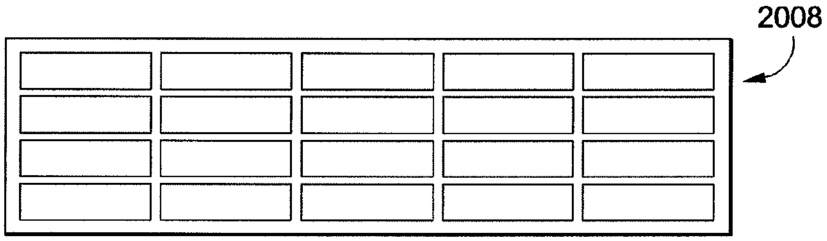
Figure 20E:
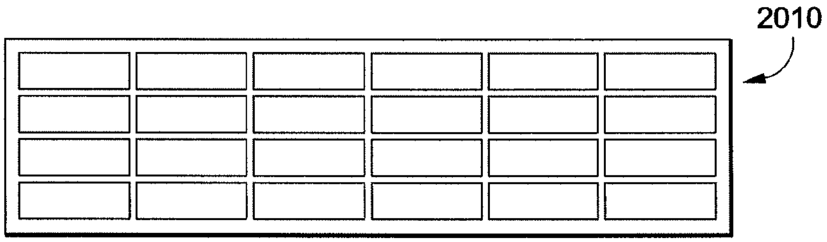
Figure 20F:
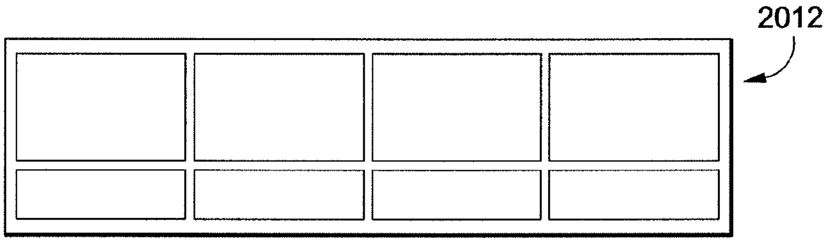

In situations where items are dispensed from the containers 150 to 164 in a first-in-first-out order (FIFO), a practical FIFO approximation using the method illustrated in FIGS. 19A-19C is achieved. FIGS. 19A-19C illustrate schematic representational top views of a portion of the drawer of FIG. 2A in various states of contents replenishment, in the direction of arrow XIX-A of FIG. 2A.

FIG. 19A shows an initial condition of a drawer 120 where doses are represented by circles in each of containers 150 to 164 of the drawer 120, and the numbers 1-8 within the circles indicates the order in which the doses have been placed into containers 150 to 164 of the drawer 120 (e.g., 1 indicates the item was the first item to be placed in the drawer 120, and thus the oldest of the items in the drawer 120). Doses would begin to be dispensed at container 162, which contains the first dose that was placed into the drawer, and then proceed to container 164, which contains the second dose that was placed into the drawer. In order to maintain the opening of sequential containers, container 160 would be opened next, since it is adjacent to previously opened and emptied containers 162 and 164. The process would then proceed to open container 158, as illustrated in FIG. 19B. If the process were to continue, it would proceed to open container 156, then container 154, and on through to container 150, thereby maintaining sequential access to the containers 150 to 164.

FIG. 19C illustrates a top cross-sectional view of a portion of the drawer of FIG. 19B after containers 158 to 164 have been replenished. The order of the medications in from containers 150 to 164 is now chronologically correct, such that the oldest medication, which is present in container 150, can be dispensed first, and the next oldest medication in container 152 can be dispensed next, and so on through to container 164, wherein sequential access to the containers 150 to 164 can be granted without affecting replenishment efficiency.

FIGS. 20A-F illustrate various configurations for a medication cabinet according to certain embodiments. The number of containers in each medication cabinet is given by the number of drawers along each row, multiplied by the number of drawers in each column, multiplied by the number of containers in each drawer. Accordingly, in the medication cabinet 2002 of FIG. 20A, where there are two drawers per column, four drawers per row, and eight containers in each drawer, there are a total of 64 containers. In the medication cabinet 2004 of FIG. 20B, where there are three drawers per column, five drawers per row, and ten containers in each drawer, there are a total of 150 containers. In the medication cabinet 2006 of FIG. 20C, where there are one drawer per column, five drawers per row, and one container in each drawer, there are a total of five containers. In the medication cabinet 2008 of FIG. 20D, where there are four drawers per column, five drawers per row, and ten containers in each drawer, there are a total of 200 containers. In the medication cabinet 2010 of FIG. 20E, where there are four drawers per column, six drawers per row, and twelve containers in each drawer, there are a total of 288 containers. In the medication cabinet 2012 of FIG. 20F, there are two types of drawers, one row of four drawers with one container each, and one row of four drawers with six containers each, for a total of 28 containers.

Although the medication cabinet 100 has been described and illustrated in examples relating to the storage and dispensing of medications, the medication cabinet 100 has applicability to a broad range of other item storage and dispensing uses. For example, the medication cabinet 100 can be used to store and dispense any item requiring restricted access, such as keys, access cards, personal effects, and so on. It should be appreciated from the foregoing description that while certain embodiments of the present disclosure are useful in the medical drug and supply field, other embodiments have applicability to a broad range of industries apart from the medical industry, where similar inventory control and security measures are preferred. The present disclosure is not intended to be limited to the medical supply and drug industry.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A medication cabinet comprising:

a drawer comprising:

a body comprising a plurality of receptacles;

a plurality of lids coupled to the body, each lid configured for movement between an open position and a closed position configured to restrict access to a respective one of the plurality of receptacles;

a plurality of fasteners respectively coupled to the plurality of lids; and a slider, coupled to the body, configured to move longitudinally along a direction of movement of the drawer between a plurality of selectable slider positions, each slider position associated with one of the plurality of lids; and the slider comprising:

a wall configured to selectively contact the plurality of fasteners so as to retain the respective lids in the closed position, wherein the wall comprises a plurality of openings, each opening associated with a respective lid, each opening positioned such that the fastener coupled to the respective lid passes through the opening and allows the lid to move from the closed position toward the open position when the slider is disposed in the slider position associated with the respective lid.

2. The cabinet of claim 1, further comprising a restricting mechanism configured to move the lid from the open position to the closed position when the drawer is returned to a position substantially within the cabinet.

3. The cabinet of claim 1, wherein the slider is configured for longitudinal movement from a first position proximal to the cabinet to a second position distal to the cabinet, and the cabinet further comprising:

a sensor configured to determine a longitudinal position of the slider; and an alert module configured to transmit an alert based on the inability of the slider to obtain a longitudinal position commanded by the sensor.

4. The cabinet of claim 1, wherein each contiguous pair of receptacles is separated by a common wall, and the drawer further comprising comprises:

a second lid, comprising a second fastener, and configured to be coupled to the body when the lids for the contiguous pair of receptacles are decoupled from the body, and further configured for movement between an open position, and a closed position configured to restrict access to the contiguous pair of receptacles, wherein the common wall of the contiguous pair of receptacles is configured to be removed.

5. The cabinet of claim 1, wherein the slider is configured for longitudinal movement from a first position proximal to the cabinet to a second position distal to the cabinet, wherein the drawer further comprises a stop lever coupled to the drawer, wherein the stop lever is held in a retracted position when the slider is in the first position, the refracted position facilitating removal of the drawer from the cabinet, and wherein the stop lever is actuated into a deployed position when the slider is in the second position, the deployed position restricting removal of the drawer from the cabinet.

6. The cabinet of claim 5, wherein the stop lever is actuated into the deployed position by a bias member coupled to the slider.

7. The cabinet of claim 1, wherein an end of the drawer proximal to the cabinet is sized and shaped to permit the drawer to move vertically along an axis perpendicular to the direction of movement of the drawer.

8. The cabinet of claim 1, wherein the lid of the at least receptacle is manually selected for actuation from the closed position to the open position, while each lid of the remaining plurality of containers is in a closed position restricting access to the remaining plurality of containers.

9. The medication cabinet of claim 1, wherein:

the body further comprises a plurality of ribs arranged in a row;

the slider further comprises a plurality of teeth disposed in a row proximate to the row of ribs;

the plurality of fasteners are configured such that when one of the plurality of lids is moved from the closed position toward the open position when the respective opening is positioned to restrict the respective fastener from passing through the respective opening, the respective fastener becomes decoupled from the lid;

the ribs, teeth, and fasteners are configured such that a fastener that becomes decoupled from the respective lid will fall into one of a plurality of gaps between the ribs and project above the ribs such that the plurality of teeth of the slider are inhibited from passing by the decoupled fastener, thereby preventing the slider from moving.

10. The medication cabinet of claim 1, further comprising:

a drive mechanism, coupled to the cabinet, and configured to control longitudinal movement of the slider; and a drawer latching mechanism coupled to the cabinet, configured to couple the drawer to the cabinet.

11. The cabinet of claim 10, wherein the drawer further comprises:

a second slider, coupled to the body, configured to move longitudinally along a direction of movement of the drawer between the plurality of selectable slider positions, the second slider comprising:

a second wall configured selectively contact the plurality of fasteners so as to retain the respective lids in the closed position, wherein the second wall comprises a plurality of openings, each opening associated with a respective lid, each opening positioned such that the second fastener coupled to the respective lid passes through the opening and allows the lid to move from the closed position toward the open position when the second slider is disposed in the slider position associated with the respective lid; and a second drive mechanism, coupled to the cabinet, and configured to control longitudinal movement of the second slider, wherein the drawer latching mechanism is configured to couple the drawer to the cabinet, and is further configured to actuate the drive mechanism and the second drive mechanism at substantially the same time, thereby resulting in the movement of each of two lids from a closed position to an open position at substantially the same time.

12. The cabinet of claim 11, wherein the actuation of the drive mechanism and the second drive mechanism results in the movement of each of three lids from closed positions to open positions at substantially the same time.

* * * * *